US012620711B2

(12) United States Patent
Sudo

(10) Patent No.: US 12,620,711 B2
(45) Date of Patent: May 5, 2026

(54) ANTENNA MODULE

(71) Applicant: Murata Manufacturing Co., Ltd., Nagaokakyo (JP)

(72) Inventor: Kaoru Sudo, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 71 days.

(21) Appl. No.: 18/898,725

(22) Filed: Sep. 27, 2024

(65) Prior Publication Data

US 2025/0023243 A1 Jan. 16, 2025

Related U.S. Application Data

(63) Continuation of application No. PCT/JP2023/005709, filed on Feb. 17, 2023.

(30) Foreign Application Priority Data

Mar. 28, 2022 (JP) ................................ 2022-051664

(51) Int. Cl.
*H01Q 7/00* (2006.01)
*H01Q 5/321* (2015.01)
*H01Q 23/00* (2006.01)

(52) U.S. Cl.
CPC ............... *H01Q 7/00* (2013.01); *H01Q 5/321* (2015.01); *H01Q 23/00* (2013.01)

(58) Field of Classification Search
CPC ........... H01Q 7/00; H01Q 5/321; H01Q 23/00
See application file for complete search history.

(56) References Cited

FOREIGN PATENT DOCUMENTS

| | | |
|---|---|---|
| JP | H11-205028 A | 7/1999 |
| JP | 2012-182584 A | 9/2012 |
| JP | 2020-036067 A | 3/2020 |
| WO | 2014/013840 A1 | 1/2014 |

OTHER PUBLICATIONS

International Search Report and Written Opinion mailed on Apr. 25, 2023, received for PCT Application PCT/JP2023/005709, filed on Feb. 17, 2023, 08 pages including English Translation.

*Primary Examiner* — Graham P Smith
(74) *Attorney, Agent, or Firm* — XSENSUS LLP

(57) ABSTRACT

An antenna module includes a dielectric substrate, loop antennas, and power feeding wires that transmit high-frequency signals to the antennas. One loop antenna is positioned inside the loop of another in plan view from the winding axis direction. Each power feeding wire has a flat electrode and a via extending along the winding axis. The flat electrodes partially overlap with their respective loop antennas but not with others. At least one via connects to its corresponding flat electrode at a position offset from the antenna in the polarization direction.

20 Claims, 17 Drawing Sheets

ANTENNA MODULE

CROSS-REFERENCE TO RELATED APPLICATIONS

The present application is a continuation application of PCT International Application No. PCT/JP2023/005709 filed on Feb. 17, 2023, designating the United States of America, which is based on and claims priority to Japanese patent application JP 2022-051664, filed Mar. 28, 2022. The entire disclosures of the above-identified applications, including the specifications, the drawings, and the claims are incorporated herein by reference in their entirety.

TECHNICAL FIELD

The present disclosure relates to an antenna module and, more particularly, to a technology for improving antenna characteristics of an antenna module having a plurality of loop antennas.

BACKGROUND ART

Japanese Unexamined Patent Application Publication No. 2020-36067 (Patent Document 1) discloses a configuration of an antenna device in which a plurality of loop antennas is arranged concentrically. In the antenna device disclosed in Japanese Unexamined Patent Application Publication No. 2020-36067 (Patent Document 1), a power feeder is arranged perpendicular to each loop antenna. By arranging the conductor of the loop antenna and the conductor of the power feeder so as to be orthogonal to each other, occurrence of induced current between the conductors is suppressed.

CITATION LIST

Patent Document

Patent Document 1: Japanese Unexamined Patent Application Publication No. 2020-36067

SUMMARY

Technical Problem

In the antenna device disclosed in Japanese Unexamined Patent Application Publication No. 2020-36067 (Patent Document 1), the power feeder (power feeding wire) extends vertically from a transmitter or a receiver to an antenna conductor. In such a case, since the length of the line of the power feeder is limited, there is a possibility that the impedance between the antenna conductor, the power feeder and a power transmitter/receiver is not sufficiently matched.

The present disclosure has been made to solve such a problem, and an object of the present disclosure is to improve the antenna characteristics of an antenna module provided with a plurality of loop antennas.

Solution to Problem

An antenna module according to the present disclosure includes a dielectric substrate, a first radiation element and a second radiation element disposed on the dielectric substrate and each having a loop-shaped wiring pattern, and a first power feeding wire and a second power feeding wire that transmit high-frequency signals to the first radiation element and the second radiation element, respectively. The second radiation element is disposed inside a loop of the first radiation element when viewed in plan view from the winding axis direction of the first radiation element (first direction). The first power feeding wire includes a first flat electrode disposed apart from the first radiation element in the first direction, and a first conductor connected to the first flat electrode and extending in the first direction. The second power feeding wire includes a second flat electrode disposed apart from the second radiation element in the first direction, and a second conductor connected to the second flat electrode and extending in the first direction. When viewed in plan view from the first direction, the first flat electrode at least partially overlaps with the first radiation element and does not overlap with the second radiation element. When viewed in plan view from the first direction, the second flat electrode at least partially overlaps with the second radiation element and does not overlap with the first radiation element. At least one of the first conductor and the second conductor is connected to the corresponding flat electrode at a position offset from the corresponding radiation element in a first polarization direction of the radiation element.

Advantageous Effects

In the antenna module according to the present disclosure, high-frequency signals are supplied to a plurality of loop-shaped radiation elements disposed on a dielectric substrate via flat electrodes offset in the polarization direction and vias connected to the flat electrodes. When viewed in plan view from the winding axis direction of the radiation element, each flat electrode does not overlap with any radiation element other than the one to which power is to be fed. With such a configuration, since the length of the line of the power feeding wire and the overlap with the radiation element to which power is to be fed in the first direction can be finely adjusted by adjusting the offset amount of the via from the radiation element, impedance matching can be facilitated. Further, since the flat electrode does not overlap with the radiation element to which power is to be fed when viewed in plan view, deterioration of isolation from other radiation elements can be suppressed. Therefore, in an antenna module provided with a plurality of loop antennas, antenna characteristics can be improved.

DESCRIPTION OF EMBODIMENTS

Figure 1:
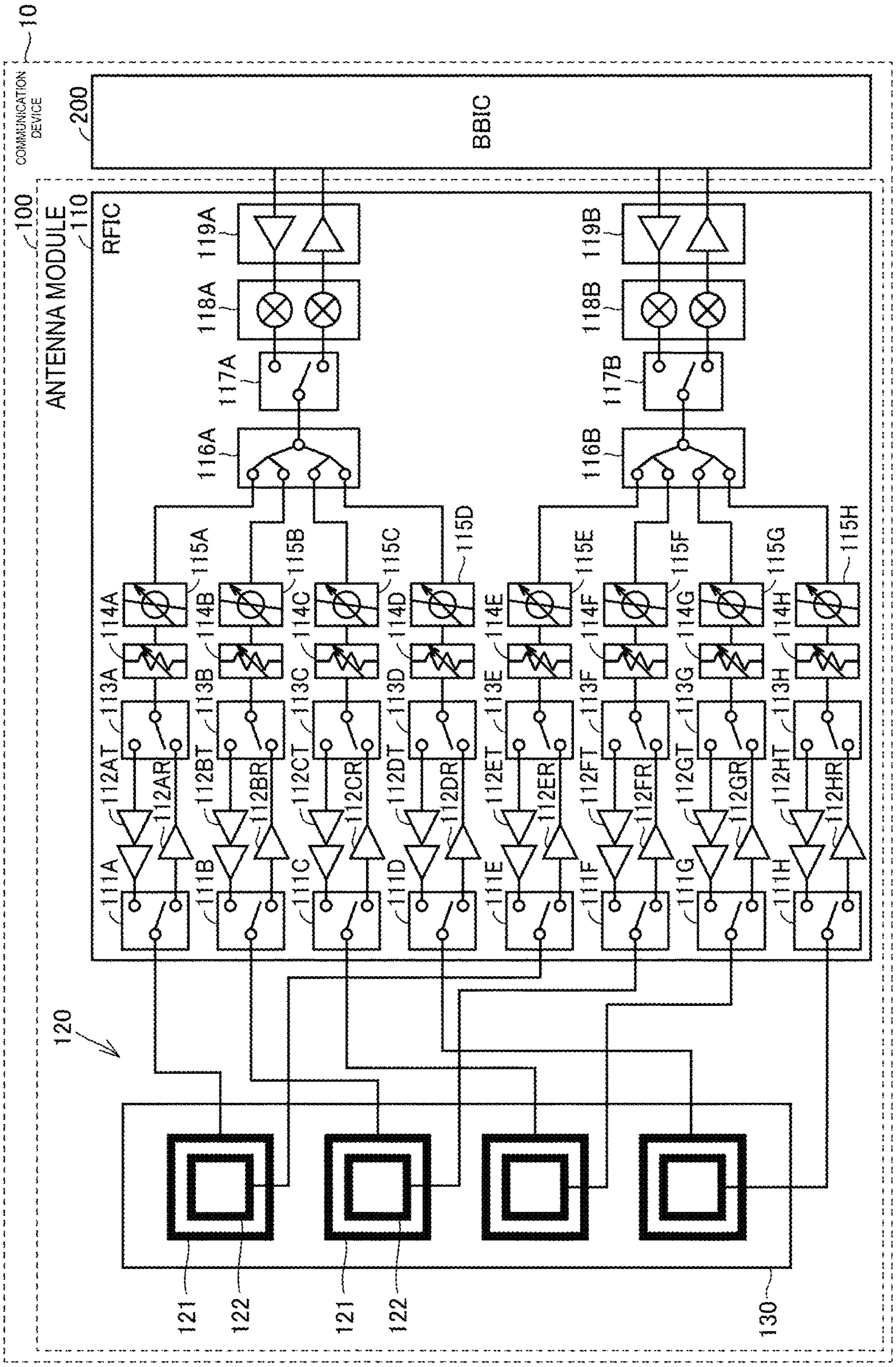
FIG. 1 is a block diagram of a communication device to which an antenna module according to Embodiment 1 is applied.

Embodiments of the present disclosure will be described in detail below with reference to the drawings. Note that the same or equivalent components are denoted by the same reference signs in the drawings and the explanations thereof are not repeated.

Embodiment 1

(Basic Configuration of Communication Device)

FIG. 1 is a block diagram of a communication device 10 to which an antenna module 100 according to the present embodiment is applied. The communication device 10 is, for example, a portable terminal such as a cellular phone, a smartphone, and a tablet, or a personal computer having a communication function. One example of the frequency band of radio waves to be used in the antenna module 100 according to the present embodiment is, for example, a millimeter wave band with a center frequency of, for example, 28 GHZ, 39 GHz and 60 GHz; however, radio waves in frequency bands other than those described above can also be applied.

As shown in FIG. 1, the communication device 10 includes the antenna module 100 and a BBIC 200 that constitutes a baseband signal processing circuit. The antenna module 100 includes an RFIC 110, which is an example of a power feeding circuit, and an antenna device 120. The communication device 10 up-converts a signal transmitted from the BBIC 200 to the antenna module 100 into a high-frequency signal and radiates the high-frequency signal from the antenna device 120, and down-converts a high-frequency signal received by the antenna device 120 and processes the high-frequency signal by the BBIC 200.

The antenna module 100 is a so-called dual-band type antenna module capable of radiating radio waves of two different frequency bands. The antenna device 120 includes a plurality of radiation elements 121 and 122 disposed on a flat plate-shaped dielectric substrate 130. The radiation element 121 is a radiation element capable of radiating a radio wave on a relatively low frequency side. The radiation element 122 is a radiation element capable of radiating a radio wave on a relatively high frequency side.

Each of the radiation elements 121 and 122 is a loop antenna having a loop-shaped wiring pattern. When viewed in plan view from the normal direction of the dielectric substrate 130, the radiation element 122 on the high-frequency side is disposed inside the loop of the radiation element 121 on the low-frequency side. The center of the loop of the radiation element 121 substantially overlaps with the center of the loop of the radiation element 122. In other words, the winding axis of the radiation element 121 and the winding axis of the radiation element 122 overlap with each other. In the present description, the description is given using as an example in which each radiation element has a substantially square loop shape; however, the loop shape is not limited to being a substantially square loop shape, but may be a circular loop shape, an elliptical loop shape, or a polygonal loop shape other than a square loop shape.

In FIG. 1, for ease of description, a case is described as an example in which the antenna device 120 is a one-dimensional array in which four sets of radiation elements 121 and 122 are arranged in a row on the dielectric substrate 130, which has a rectangular shape. Note that the number of sets of the radiation element is not limited to four. As will be described later, the antenna device 120 may have a configuration in which one radiation element 121 and one radiation element 122 are provided, or may have a configuration in which a plurality of sets of radiation elements 121 and 122 are arranged in a two-dimensional array.

The RFIC 110 includes switches 111A to 111H, 113A to 113H, 117A and 117B, power amplifiers 112AT to 112HT, low noise amplifiers 112AR to 112HR, attenuators 114A to 114H, phase shifters 115A to 115H, signal combiners/distributors 116A and 116B, mixers 118A and 118B, and amplification circuits 119A and 119B. Among these components, the switches 111A to 111D, 113A to 113D, and 117A, the power amplifiers 112AT to 112DT, the low noise amplifiers 112AR to 112DR, the attenuators 114A to 114D, the phase shifters 115A to 115D, the signal combiner/distributor 116A, the mixer 118A, and the amplification circuit 119A constitute a circuit for a high-frequency signal radiated from the radiation element 121. The switches 111E to 111H, 113E to 113H, and 117B, the power amplifiers 112ET to 112HT, the low noise amplifiers 112ER to 112 HR, the attenuators 114E to 114H, the phase shifters 115E to 115H, the signal combiner/distributor 116B, the mixer 118B, and the amplification circuit 119B constitute a circuit for a high-frequency signal radiated from the radiation element 122.

When transmitting the high-frequency signals, the switches 111A to 111H, and 113A to 113H are switched to the power amplifiers 112AT to 112HT, and the switches 117A and 117B are connected to transmitting amplifiers of the amplification circuits 119A and 119B. When receiving the high-frequency signals, the switches 111A to 111H, and 113A to 113H are switched to the low noise amplifiers 112AR to 112 HR, and the switches 117A and 117B are connected to receiving amplifiers of the amplification circuits 119A and 119B.

The signal transmitted from the BBIC 200 is amplified by the amplification circuits 119A and 119B, and up-converted by the mixers 118A and 118B. A transmission signal, which is the up-converted high-frequency signal, is branched into four signals by the signal combiners/distributors 116A and 116B; and the branched signals pass through corresponding signal paths and are fed to different radiation elements 121 and 122, respectively. By adjusting the degree of phase shift of the phase shifters 115A to 115H disposed in each signal path individually, directivity of the radio wave output from each radiation element can be adjusted.

Reception signals, which are the high-frequency signals received by each of the radiation elements 121 and 122, are transmitted to the RFIC 110, and multiplexed by the signal combiners/distributors 116A and 116B via four different signal paths. The multiplexed reception signal is down-converted by the mixers 118A and 118B, amplified by the amplification circuits 119A and 119B, and transmitted to the BBIC 200.

The RFIC 110 is formed, for example, as a single-chip integrated circuit component that includes the above circuit configuration. Alternatively, a single-chip integrated circuit component may be formed for each corresponding radiation element with respect to the devices (i.e., the switches, the power amplifiers, the low-noise amplifiers, the attenuators, and the phase shifters) in the RFIC 110 corresponding to each of the radiation elements 121 and 122.

(Structure of Antenna Module)

Figure 2:
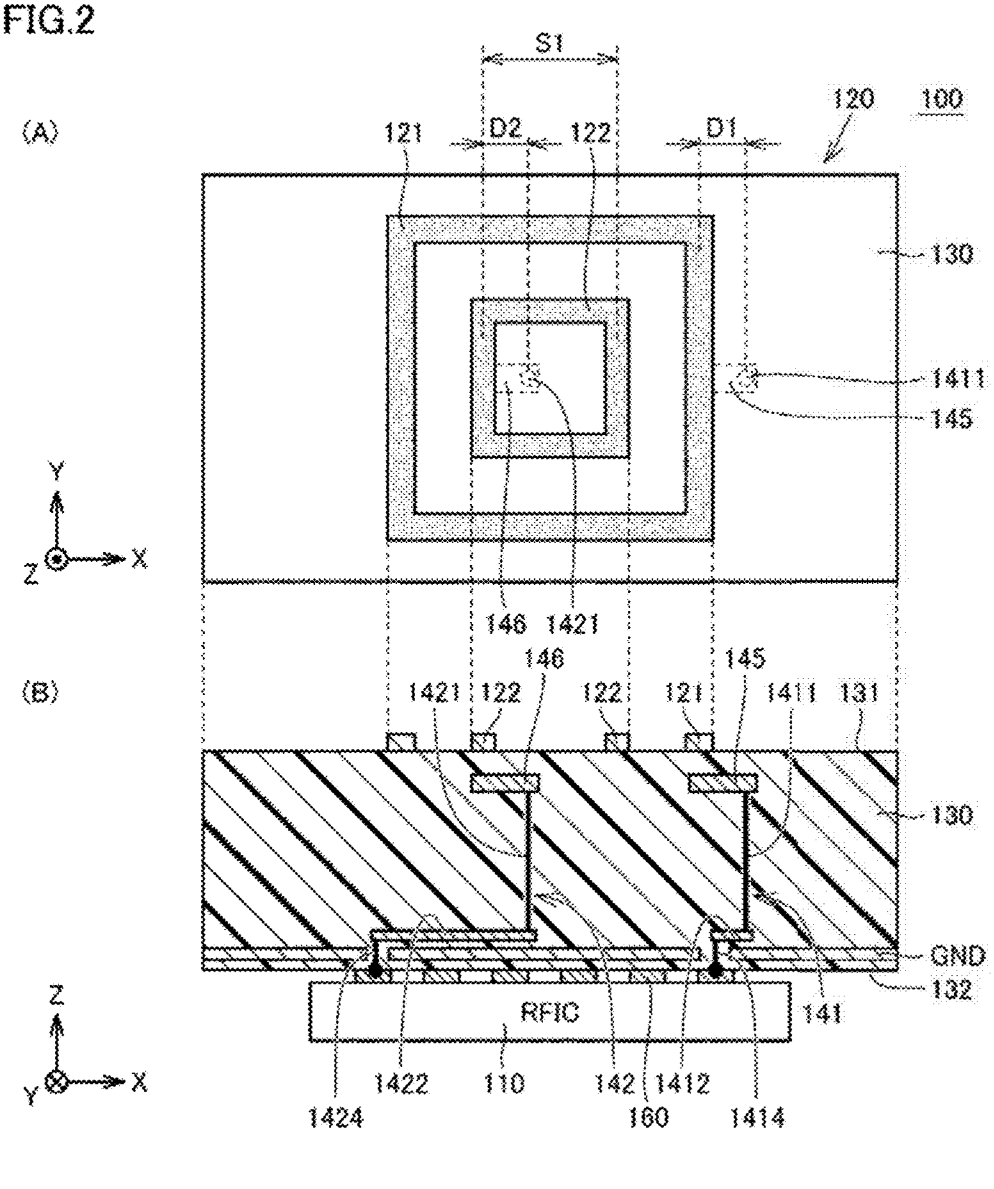
FIG. 2 is a plan view and a transparent side view of the antenna module of FIG. 1.

Next, the configuration of the antenna module 100 according to Embodiment 1 will be described in detail with reference to FIG. 2. In FIG. 2, the top view (FIG. 2(A)) is a plan view of the antenna module 100, and the bottom view (FIG. 2(B)) is a transparent side view of the antenna module 100. In FIG. 2, for ease of description, a case where the radiation elements 121 and 122 are composed of one radiation element 121 and one radiation element 122 is described as an example.

As shown in FIG. 2, the antenna module 100 further includes power feeding wires 141 and 142 and a ground electrode GND, in addition to the dielectric substrate 130, the radiation elements 121 and 122 and the RFIC 110. In the following description, the normal direction of the dielectric substrate 130, i.e., the winding axis direction of each of the radiation elements, is defined as a Z-axis direction. In a plane perpendicular to the Z-axis direction, the direction along the long side of the rectangular dielectric substrate 130 is defined as an X-axis direction, and the direction along the short side of the rectangular dielectric substrate 130 is defined as a Y-axis direction. The positive direction of the Z-axis in each of the drawings may be referred to as an "upper side", and the negative direction may be referred to as a "lower side".

The dielectric substrate 130 is, for example, an LTCC (low temperature co-fired ceramic) multilayer substrate, a multilayer resin substrate formed by stacking a plurality of resin layers made of a resin such as epoxy or polyimide, a multilayer resin substrate formed by stacking a plurality of resin layers made of a LCP (liquid crystal polymer) having a lower dielectric constant, a multilayer resin substrate formed by stacking a plurality of resin layers made of a fluorine resin, a multilayer resin substrate formed by stacking a plurality of resin layers made of PET (polyethylene terephthalate), or a ceramic multilayer substrate other than an LTCC multilayer substrate. Note that the dielectric substrate 130 does not necessarily have a multilayer structure, but may be a single-layer substrate.

The dielectric substrate 130 has a rectangular shape when viewed in plan view from the normal direction (Z-axis direction). The radiation elements 121 and 122 are disposed on an upper surface 131 of the dielectric substrate 130. The radiation elements 121 and 122 may be disposed so as to be exposed on the surface of the dielectric substrate 130 as shown in the example of FIG. 2(B), or may be disposed in an internal dielectric layer near the upper surface 131 of the dielectric substrate 130. A ground electrode GND is arranged in a dielectric layer near a lower surface 132 of the dielectric substrate 130 over the entire surface of the dielectric substrate 130. The RFIC 110 is mounted on the lower surface 132 of the dielectric substrate 130 via solder bumps 160. Alternatively, the RFIC 110 may be connected to the dielectric substrate 130 using a multipole connector, instead of the solder connection.

As described above, the radiation element 122 is disposed inside the loop of the radiation element 121. In each radiation element, a length L of the loop along the center of the wiring pattern corresponds to a wavelength A of the radio wave to be radiated. If the length of the loop of the radiation element 121 is L1 and the length of the loop of the radiation element 122 is L2, then L1>L2 is satisfied. Further, if the frequencies of the radio waves radiated from the radiation elements 121 and 122 are f1 and f2, respectively, then f1<f2 is satisfied. That is, the radio wave on the relatively high frequency side is radiated from the radiation element 122 on the inner side.

The radiation elements 121 and 122 are supplied with the high-frequency signals from the RFIC 110 via the power feeding wires 141 and 142, respectively. The power feeding wire 141 includes flat electrodes 145 and 1412 and vias 1411 and 1414. The power feeding wire 142 includes flat electrodes 146 and 1422 and vias 1421 and 1424.

The flat electrode 145 of the power feeding wire 141 is disposed apart from the radiation element 121 in the direction of the ground electrode GND near the center of a side of the radiation element 121 along the Y-axis on the positive side of the X-axis. The flat electrode 145 is a strip-shaped electrode, and when viewed in plan view from the normal direction of the dielectric substrate 130, one end portion of the flat electrode 145 overlaps with the radiation element 121. The flat electrode 145 extends from the overlapping portion with the radiation element 121 to the outside of the loop of the radiation element 121, i.e., in the positive direction of the X-axis. In other words, the flat electrode 145 extends in the polarization direction of the radiation element 121.

The via 1411 is connected to the other end portion of the flat electrode 145. The via 1411 extends in the Z-axis direction inside the dielectric substrate 130 and is connected to one end portion of the strip-shaped flat electrode 1412 disposed in a layer close to the ground electrode GND. The via 1414 is connected to the other end portion of the flat electrode 1412. The via 1414 passes through the ground electrode GND to be connected to the RFIC 110 via the solder bump 160.

When viewed in plan view from the normal direction of the dielectric substrate 130, the via 1411 is connected to the flat electrode 145 at a position offset by a distance D1 from the radiation element 121. More specifically, the distance D1 is the shortest distance in the X-axis direction from the center of the width of the wiring pattern of the radiation element 121 to the center of the via 1411. When the length of the path of the radiation element 121 (the length of the loop) is L1, the offset amount D1 is preferably L½ or less. With such an offset amount, undesired resonance can be suppressed. Since the flat electrode 145 extends further outward than the radiation element 121 disposed outside the radiation element 122, the flat electrode 145 does not overlap with the radiation element 122 when viewed in plan view from the normal direction of the dielectric substrate 130.

The flat electrode 146 of the power feeding wire 142 is disposed apart from the radiation element 122 in the direction of the ground electrode GND near the center of a side of the radiation element 122 along the Y-axis on the negative side of the X-axis. The flat electrode 146 is a strip-shaped electrode, and when viewed in plan view from the normal direction of the dielectric substrate 130, one end portion of the flat electrode 146 overlaps with the radiation element 122. The flat electrode 146 extends from the overlapping portion with the radiation element 122 to the inside of the loop of the radiation element 122, i.e., in the positive direction of the X-axis. In other words, the flat electrode 146 extends in the polarization direction of the radiation element 121.

The via 1421 is connected to the other end portion of the flat electrode 146. The via 1421 extends in the Z-axis direction inside the dielectric substrate 130 and is connected to one end portion of the strip-shaped flat electrode 1422 disposed in a layer close to the ground electrode GND. The via 1424 is connected to the other end portion of the flat electrode 1422. The via 1424 passes through the ground electrode GND to be connected to the RFIC 110 via the solder bump 160.

When viewed in plan view from the normal direction of the dielectric substrate 130, the via 1421 is connected to the flat electrode 146 at a position offset by a distance D2 from the radiation element 122. More specifically, the distance D2 is the shortest distance in the X-axis direction from the center of the width of the wiring pattern of the radiation element 122 to the center of the via 1421. When the length of the path of the radiation element 122 (the length of the loop) is L2, the offset amount D2 is preferably L2/2 or less; and further, when the distance between the centers of the wiring patterns of the radiation element 122 in the X-axis direction of is S1, the offset amount D2 is preferably S½ or less. Since S1<L2 is satisfied, the offset amount D2 is consequently S½ or less. By setting the offset amount D2 to such a size, the via 1421 remains within the loop of the radiation element 122. Therefore, when viewed in plan view from the normal direction of the dielectric substrate 130, the via 1421 does not overlap with the radiation element 121. The flat electrode 145 and the flat electrode 146 are disposed on opposite sides to each other with respect to the winding axis.

In the antenna module 100 of Embodiment 1, the power feeding wires 141 and 142 supply the high-frequency signals to the radiation elements 121 and 122, respectively, by capacitance-coupling. Further, the vias 1411 and 1421 of the power feeding wires 141 and 142 are disposed at positions offset from the corresponding radiation elements 121 and 122. In such a configuration of the power feeding wires 141 and 142, the capacitance component of the impedance can be adjusted by adjusting the degree of capacitance-coupling (i.e., the distance and overlapping area between the radiation element and the flat electrode). Further, the inductance component of the impedance can be adjusted by adjusting the offset amount D1 of the via 1411 and the offset amount D2 of the via 1421. Therefore, since fine adjustment of the impedance between the radiation element and the power feeding wire is facilitated, deterioration in antenna characteristics caused by impedance mismatch can be suppressed.

Further, since the via offset from the radiation element is disposed so as not to overlap with the other radiation element, deterioration in isolation characteristics between the radiation elements can be suppressed.

(Isolation Characteristics)

The isolation characteristics between the radiation elements of the antenna module 100 of Embodiment 1 will be described below, with reference to FIG. 3, in comparison to an antenna module 100X of a comparative example.

Figure 3:
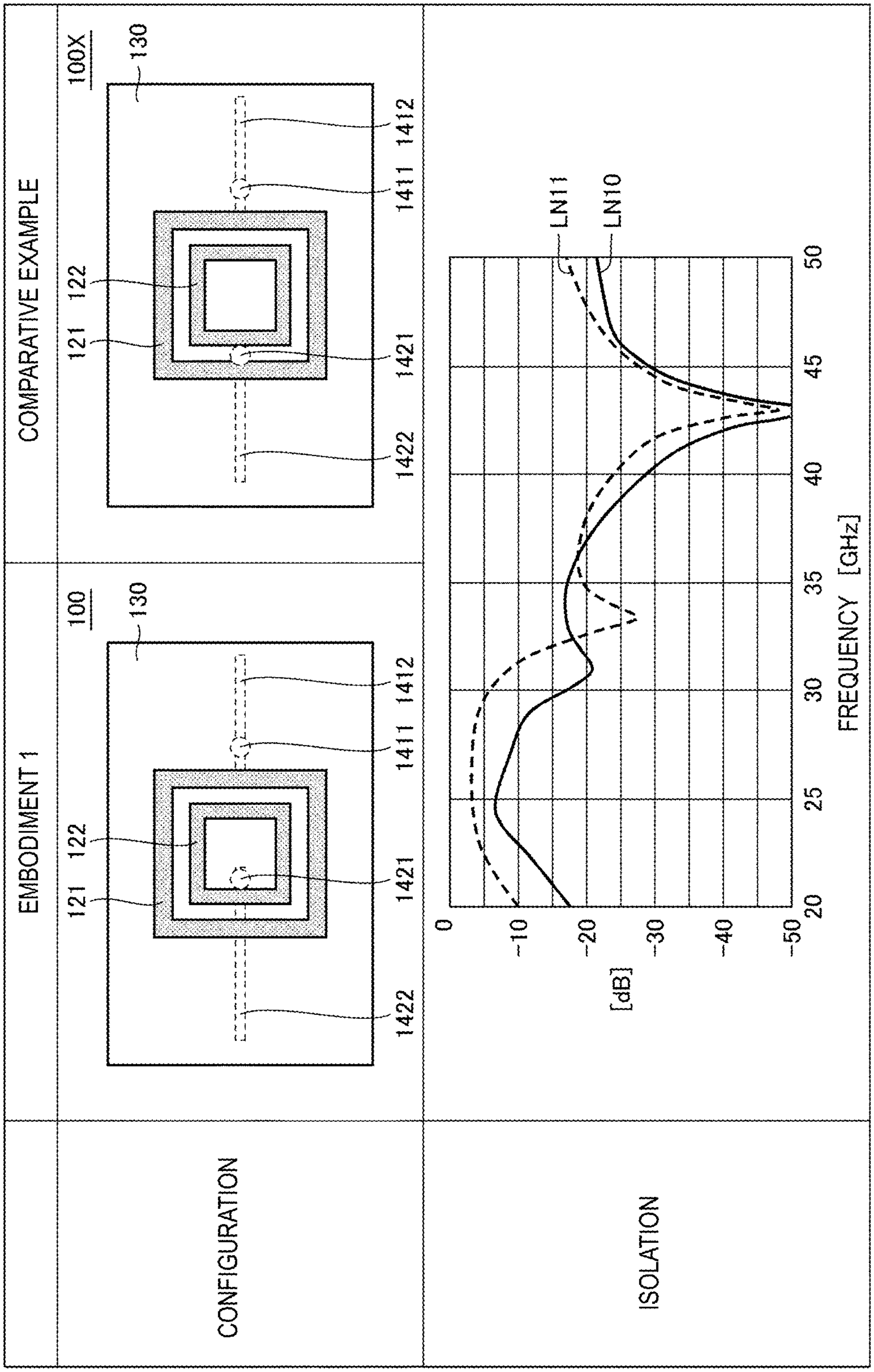
FIG. 3 is a view for explaining isolation characteristics between radiation elements of the antenna module of Embodiment 1 and an antenna module of a comparative example.

FIG. 3 is a view for explaining the isolation characteristics between the radiation elements of the antenna module of Embodiment 1 and an antenna module of the comparative example. The upper part of FIG. 3 is a plan view of the antenna module 100 of Embodiment 1 and an antenna module 100X of the comparative example. The lower part of FIG. 3 shows the isolation characteristics between radiation elements in the antenna modules 100 and 100X. The isolation characteristics of the antenna module 100 are indicated by a solid line LN10, and the isolation characteristics of the antenna module 100X are indicated by a broken line LN11.

In the antenna module 100X of the comparative example, a via 1421 of a power feeding wire 142 of a radiation element 122 on the inner side is offset to the outside of the radiation element 122. The via 1421 overlaps with a radiation element 121 when viewed in plan view from the normal direction of a dielectric substrate 130.

As shown in FIG. 3, it can be known that the isolation of the antenna module 100 of Embodiment 1 is better than that of the antenna module 100X of the comparative example in both the 28 GHz band (24 GHz to 32 GHZ), which is the frequency band of the radiation element 121, and the 39 GHz band (38 GHz to 44 GHZ), which is the frequency band of the radiation element 122.

As described above, in the power feeding wire for supplying the high-frequency signal to the radiation element, by using a configuration in which the via is disposed to be offset from the radiation element and the high-frequency signal is supplied to the radiation element by capacitance-coupling, the degree of capacitance-coupling and the offset amount can be used as parameters for adjusting the impedance between the radiation element and the power feeding wire, and the impedance can be finely adjusted. Therefore, deterioration in antenna characteristics caused by impedance mismatch can be suppressed.

Further, isolation between the radiation elements can be ensured by offsetting the via so that it does not overlap with the other radiation element when viewed in plan view from the normal direction of the dielectric substrate.

In the above description, a configuration has been described in which both vias 1411 and 1421 are offset from the radiation elements 121 and 122; however, another configuration is also possible in which only one of the vias 1411 and 1421 is offset from the corresponding radiation element.

The "radiation element 121" and the "radiation element 122" in Embodiment 1 correspond to the "first radiation element" and the "second radiation element" in the present disclosure, respectively. The "power feeding wire 141" and the "power feeding wire 142" in Embodiment 1 correspond to the "first power feeding wire" and the "second power feeding wire" in the present disclosure, respectively. The "flat electrode 145" and the "flat electrode 146" in Embodiment 1 correspond to the "first flat electrode" and the "second flat electrode" in the present disclosure, respectively. The "via 1411" and the "via 1421" in Embodiment 1 correspond to the "first conductor" and the "second conductor" in the present disclosure, respectively.

VARIATIONS

Variations of the configuration of the antenna module will be described below with reference to FIGS. 4 to 15. In the following variations, the description of the elements identical to those of the antenna module 100 of Embodiment 1 will not be repeated.

Variation 1

Figure 4:
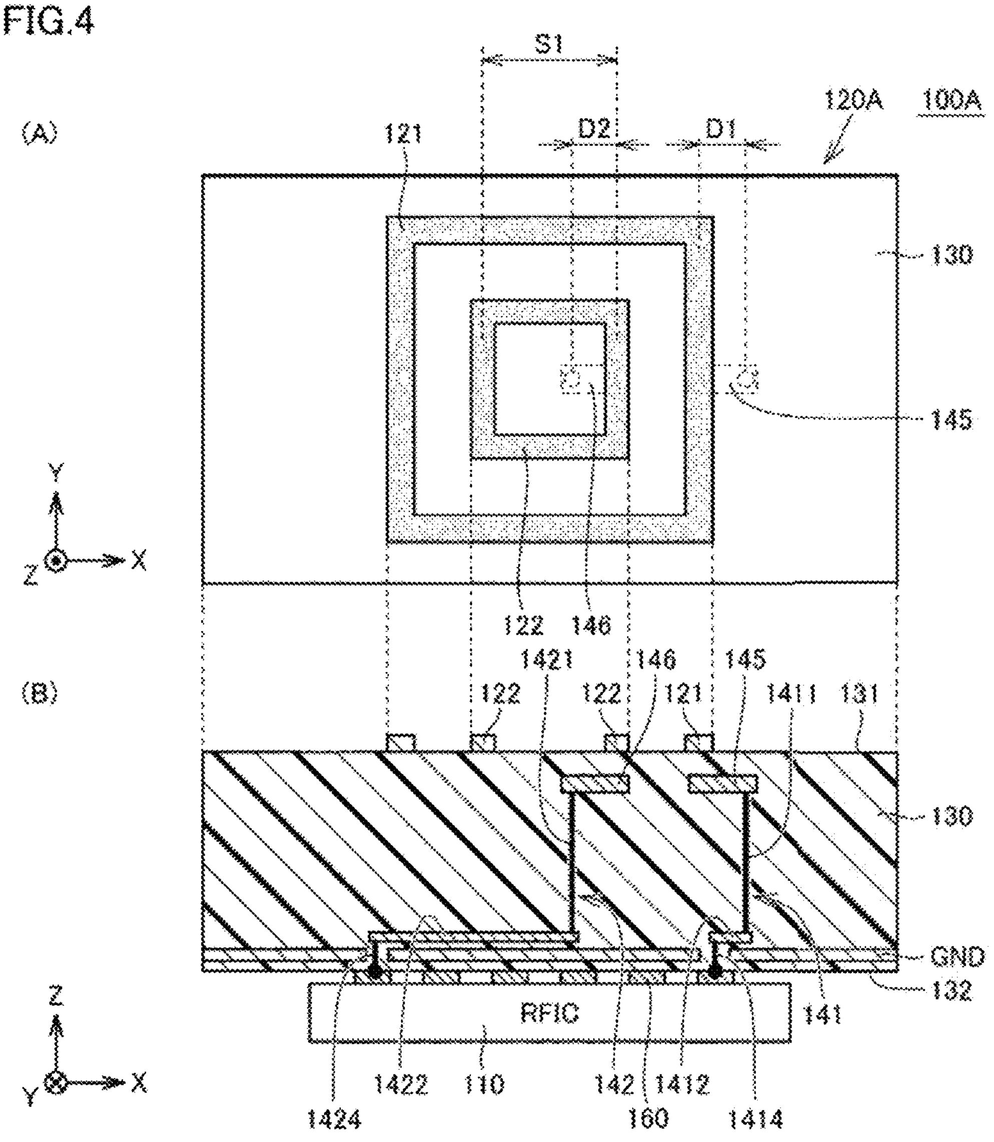
FIG. 4 is a plan view and a transparent side view of an antenna module of Variation 1.

FIG. 4 is a plan view and a transparent side view of an antenna module 100A of Variation 1. In an antenna device

120A of the antenna module 100A, the position of the power feeding point in the radiation element 122, i.e., the arrangement of the power feeding wire 142, is different from that of the antenna module 100.

More specifically, the flat electrode 146 of the power feeding wire 142 is disposed near the center of a side of the radiation element 122 along the Y-axis on the positive side of the X-axis. When viewed in plan view from the normal direction of the dielectric substrate 130, one end portion of the flat electrode 146 overlaps with the radiation element 122. The flat electrode 146 extends from the overlapping portion with the radiation element 122 to the inside of the loop of the radiation element 122, i.e., in the negative direction of the X-axis; and the via 1421 is connected to the other end portion of the flat electrode 146. In the antenna module 100A, the flat electrode 145 and the flat electrode 146 are disposed on the same side as each other with respect to the winding axis.

Also in the antenna module 100A, when viewed in plan view from the normal direction of the dielectric substrate 130, the via 1411 does not overlap with the radiation element 122, and the via 1421 does not overlap with the radiation element 121.

Even in such a configuration, since the impedance between the radiation element and the power feeding wire can be finely adjusted by adjusting the capacitance-coupling between the radiation element and the flat electrode and/or the offset amount between the radiation element and the via, deterioration in antenna characteristics caused by impedance mismatch can be suppressed.

Further, since the via offset from the radiation element is disposed so as not to overlap with the other radiation element, deterioration in isolation characteristics between the radiation elements can be suppressed.

Variation 2

Figure 5:
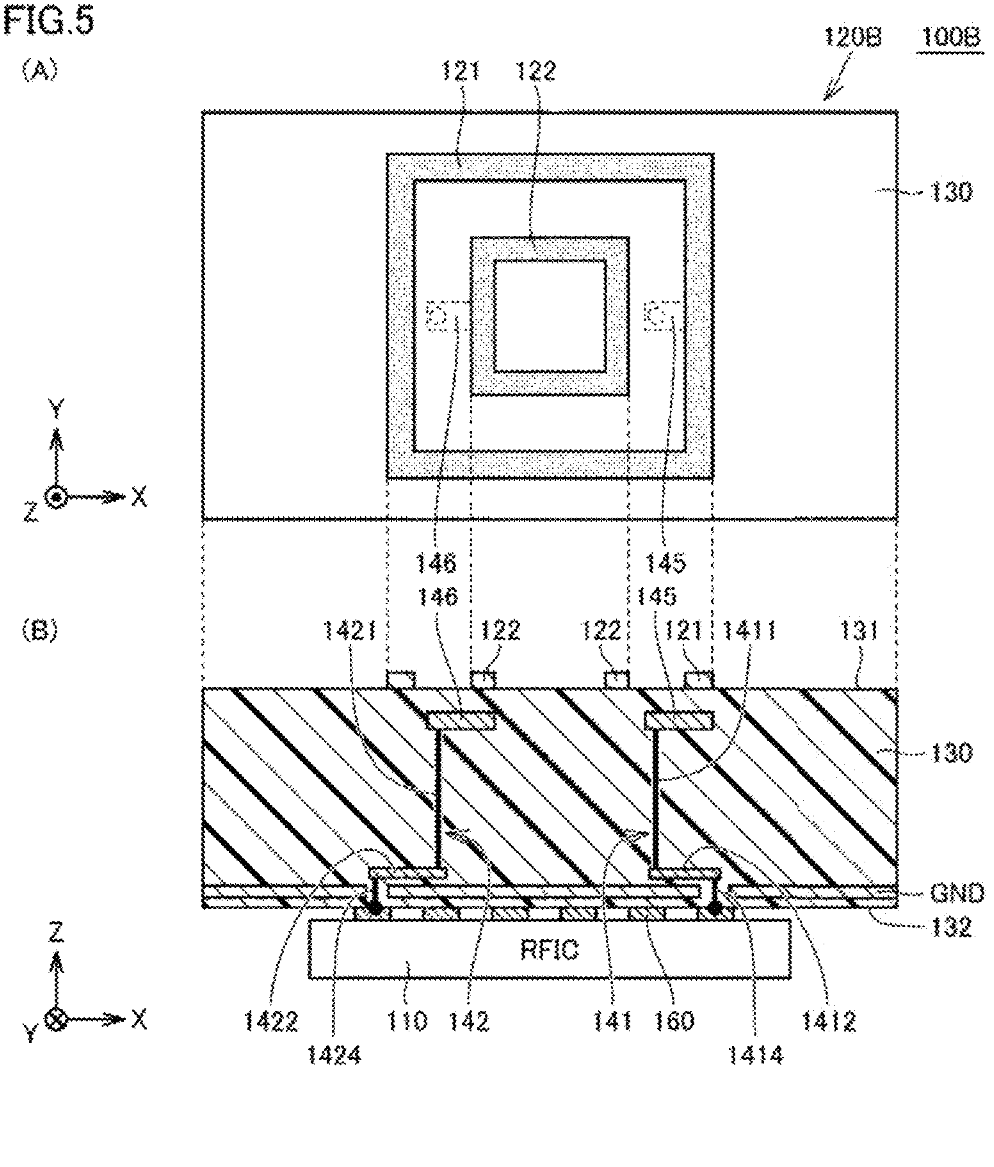
FIG. 5 is a plan view and a transparent side view of an antenna module of Variation 2.

FIG. 5 is a plan view and a transparent side view of an antenna module 100B of Variation 2. In an antenna device 120B of the antenna module 100B, the via to the radiation element 121 is offset to the inside of the loop and the via to the radiation element 122 is offset to the outside of the loop compared to the antenna module 100.

More specifically, the flat electrode 145 of the power feeding wire 141 is disposed near the center of a side of the radiation element 121 along the Y-axis on the positive side of the X-axis. When viewed in plan view from the normal direction of the dielectric substrate 130, one end portion of the flat electrode 145 overlaps with the radiation element 121. The flat electrode 145 extends from the overlapping portion with the radiation element 121 to the inside of the loop of the radiation element 121, i.e., in the negative direction of the X-axis; and the via 1411 is connected to the other end portion of the flat electrode 145.

The flat electrode 146 of the power feeding wire 142 is arranged near the center of a side of the radiation element 122 along the Y-axis on the negative side of the X-axis. When viewed in plan view from the normal direction of the dielectric substrate 130, one end portion of the flat electrode 146 overlaps with the radiation element 122. The flat electrode 146 extends from the overlapping portion with the radiation element 122 to the outside of the loop of the radiation element 122, i.e., in the negative direction of the X-axis; and the via 1421 is connected to the other end portion of the flat electrode 146.

In other words, when viewed in plan view from the normal direction of the dielectric substrate 130, both the via 1411 corresponding to the radiation element 121 and the via 1421 corresponding to the radiation element 122 are disposed between the radiation element 121 and the radiation element 122. In the antenna module 100B, the flat electrode 145 and the flat electrode 146 are disposed on opposite sides to each other with respect to the winding axis.

In the antenna module 100B as well, the via 1411 does not overlap with the radiation element 122 and the via 1421 does not overlap with the radiation element 121 when viewed in plan view from the normal direction of the dielectric substrate 130.

Even in such a configuration, since the impedance between the radiation element and the power feeding wire can be finely adjusted by adjusting the capacitance-coupling between the radiation element and the flat electrode and/or the offset amount between the radiation element and the via, deterioration in antenna characteristics caused by impedance mismatch can be suppressed.

Further, since the via offset from the radiation element is disposed so as not to overlap with the other radiation element, deterioration in isolation characteristics between the radiation elements can be suppressed.

Variation 3

Figure 6:
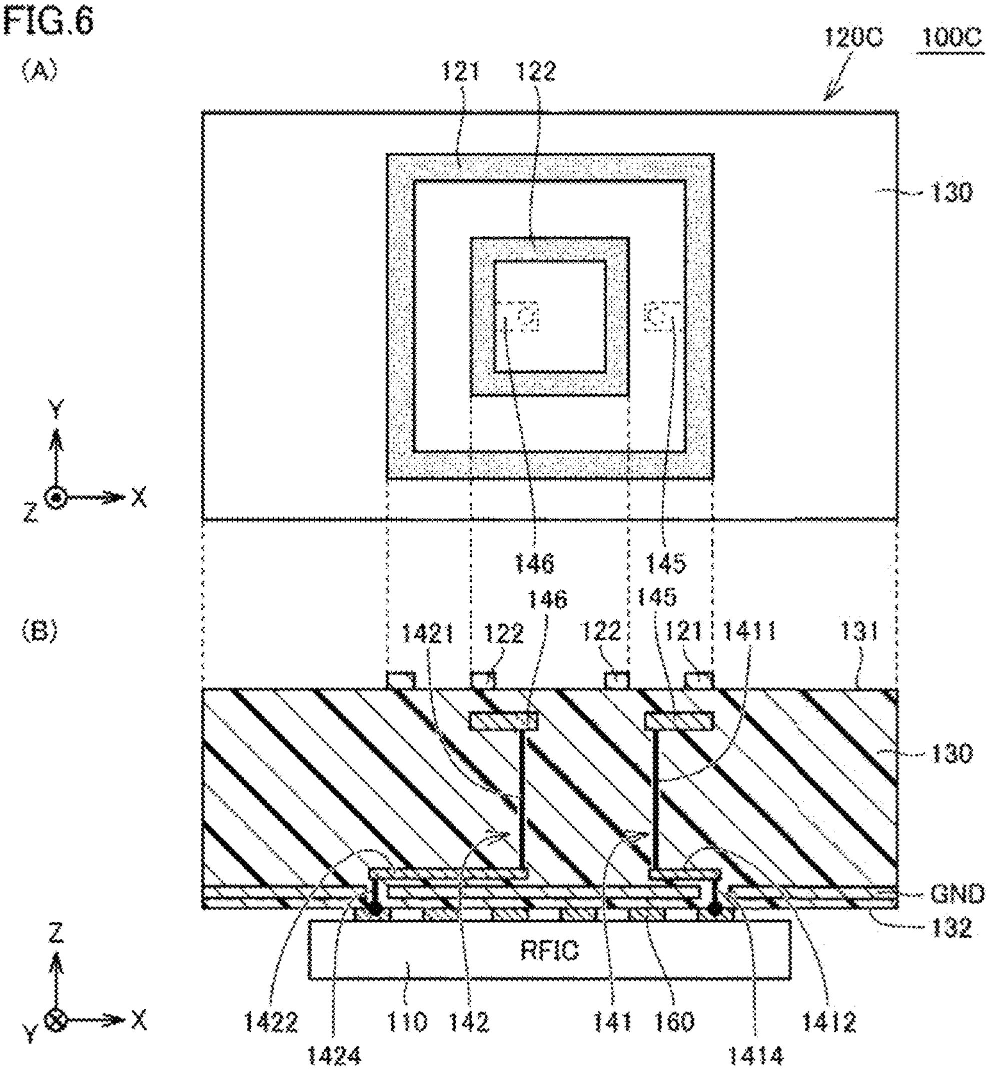
FIG. 6 is a plan view and a transparent side view of an antenna module of Variation 3.

FIG. 6 is a plan view and a transparent side view of an antenna module 100C of Variation 3. In an antenna device 120C of the antenna module 100C, the via to the radiation element 121 is offset to the inside of the loop compared to the antenna module 100. That is, the both vias to the radiation elements 121 and 122 are offset to the inside of the loop of the corresponding radiation element.

More specifically, the flat electrode 145 of the power feeding wire 141 is disposed near the center of a side of the radiation element 121 along the Y-axis on the positive side of the X-axis. When viewed in plan view from the normal direction of the dielectric substrate 130, one end portion of the flat electrode 145 overlaps with the radiation element 121. The flat electrode 145 extends from the overlapping portion with the radiation element 121 to the inside of the loop of the radiation element 121, i.e., in the negative direction of the X-axis; and the via 1411 is connected to the other end portion of the flat electrode 145.

In other words, when viewed in plan view from the normal direction of the dielectric substrate 130, the via 1411 corresponding to the radiation element 121 is disposed between the radiation element 121 and the radiation element 122. In FIG. 6, the flat electrode 145 and the flat electrode 146 are disposed on opposite sides to each other with respect to the winding axis; however, the flat electrode 145 and the flat electrode 146 may also be disposed on the same side as each other with respect to the winding axis.

Also in the antenna module 100C, when viewed in plan view from the normal direction of the dielectric substrate 130, the via 1411 does not overlap with the radiation element 122, and the via 1421 does not overlap with the radiation element 121.

Even in such a configuration, since the impedance between the radiation element and the power feeding wire can be finely adjusted by adjusting the capacitance-coupling between the radiation element and the flat electrode and/or the offset amount between the radiation element and the via, deterioration in antenna characteristics caused by impedance mismatch can be suppressed.

Further, since the via offset from the radiation element is disposed so as not to overlap with the other radiation element, deterioration in isolation characteristics between the radiation elements can be suppressed.

Variation 4

Figure 7:
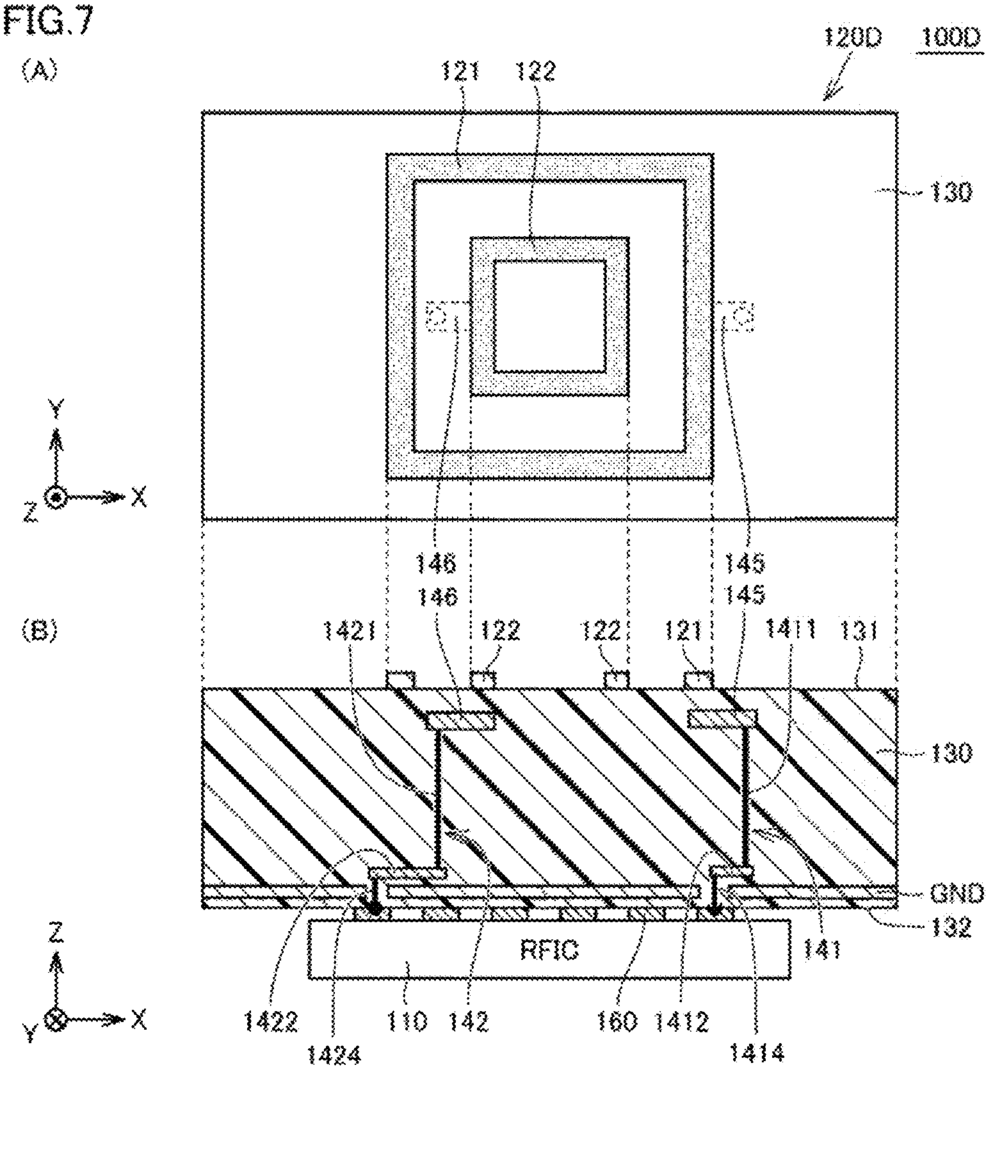
FIG. 7 is a plan view and a transparent side view of an antenna module of Variation 4.

FIG. 7 is a plan view and a transparent side view of an antenna module 100D of Variation 4. In an antenna device 120D of the antenna module 100D, the via to the radiation element 122 is offset to the outside of the loop compared to the antenna module 100. That is, both vias to the radiation elements 121 and 122 are offset to the outside of the loop of the corresponding radiation element.

More specifically, the flat electrode 146 of the power feeding wire 142 is disposed near the center of a side of the radiation element 122 along the Y-axis on the negative side of the X-axis. When viewed in plan view from the normal direction of the dielectric substrate 130, one end portion of the flat electrode 146 overlaps with the radiation element 122. The flat electrode 146 extends from the overlapping portion with the radiation element 122 to the outside of the loop of the radiation element 122, i.e., in the negative direction of the X-axis; and the via 1421 is connected to the other end portion of the flat electrode 146.

Also in the antenna module 100D, when viewed in plan view from the normal direction of the dielectric substrate 130, the via 1411 does not overlap with the radiation element 122, and the via 1421 does not overlap with the radiation element 121. In the antenna module 100D, the flat electrode 145 and the flat electrode 146 are disposed on opposite sides to each other with respect to the winding axis; however, the flat electrode 145 and the flat electrode 146 may also be disposed on the same side as each other with respect to the winding axis.

Even in such a configuration, since the impedance between the radiation element and the power feeding wire can be finely adjusted by adjusting the capacitance-coupling between the radiation element and the flat electrode and/or the offset amount between the radiation element and the via, deterioration in antenna characteristics caused by impedance mismatch can be suppressed.

Further, since the via offset from the radiation element is disposed so as not to overlap with the other radiation element, deterioration in isolation characteristics between the radiation elements can be suppressed.

Variation 5

Figure 8:
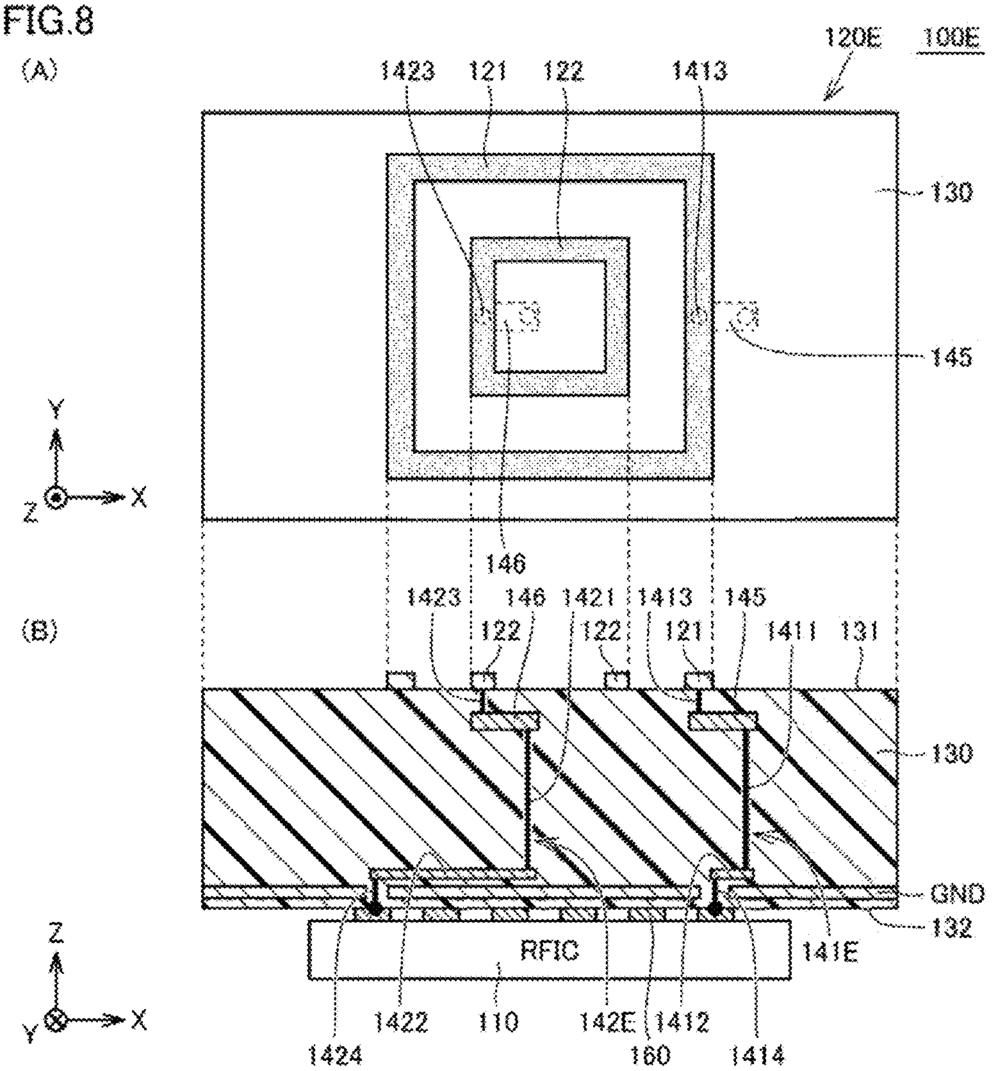
FIG. 8 is a plan view and a transparent side view of an antenna module of Variation 5.

FIG. 8 is a plan view and a transparent side view of an antenna module 100E of Variation 5. In an antenna device 120E of the antenna module 100E, the power feeding wire is directly connected to the corresponding radiation element, instead of being capacitance-coupled to the corresponding radiation element. In the antenna module 100E, the power feeding wires 141 and 142 are replaced with power feeding wires 141E and 142E.

More specifically, the power feeding wire 141E further includes a via 1413 for connecting the flat electrode 145 and the radiation element 121, in addition to the configuration of the power feeding wire 141. When viewed in plan view from the normal direction of the dielectric substrate 130, the via 1413 extends, at a position where the radiation element 121 and the flat electrode 145 overlap with each other, from the radiation element 121 to the flat electrode 145 in the Z-axis direction.

The power feeding wire 142E further includes a via 1423 for connecting the flat electrode 146 and the radiation element 122, in addition to the configuration of the power feeding wire 142. When viewed in plan view from the normal direction of the dielectric substrate 130, the via 1423 extends, at a position where the radiation element 122 and the flat electrode 146 overlap with each other, from the radiation element 122 to the flat electrode 146 in the Z-axis direction.

In the antenna module 100E, since there is no capacitance-coupling portion like the antenna module 100, the impedance is adjusted only by adjusting the offset amount of the via, so that the adjustment allowance of the impedance is slightly smaller than that of the antenna module 100; however, since the power feeding wire and the radiation element are directly connected to each other, the antenna characteristics can be improved in that loss can be reduced.

Further, since the via offset from the radiation element is disposed so as not to overlap with the other radiation element, deterioration in isolation characteristics between the radiation elements can be suppressed.

The “via 1413” and the “via 1423” in Variation 5 correspond to the “third conductor” and the “fourth conductor” in the present disclosure, respectively.

Variation 6

Figure 9:
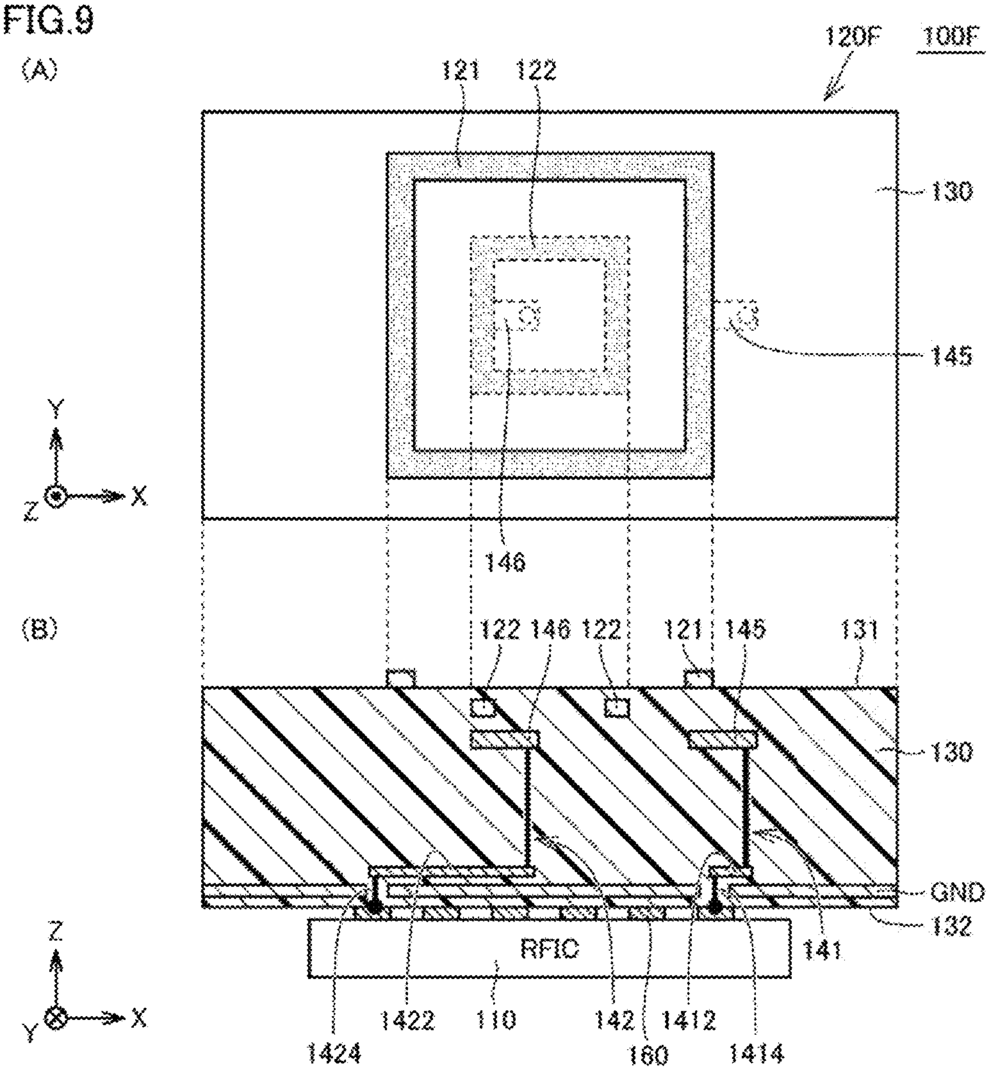
FIG. 9 is a plan view and a transparent side view of an antenna module of Variation 6.

FIG. 9 is a plan view and a transparent side view of an antenna module 100F of Variation 6. An antenna device 120F of the antenna module 100F differs from the antenna module 100 in that the radiation element 121 and the radiation element 122 are disposed on different layers of the dielectric substrate 130.

More specifically, in the antenna module 100F, the radiation element 121 is disposed on the upper surface 131 of the dielectric substrate 130, and the radiation element 122 is disposed on in an inner layer of the dielectric substrate 130. In other words, the radiation element 121 and the radiation element 122 are disposed at different positions in the normal direction (i.e., the winding axis direction) of the dielectric substrate 130.

Even in such a configuration, since the impedance between the radiation element and the power feeding wire can be finely adjusted by adjusting the capacitance-coupling between the radiation element and the flat electrode and/or the offset amount between the radiation element and the via, deterioration in antenna characteristics caused by impedance mismatch can be suppressed.

Further, since the via offset from the radiation element is disposed so as not to overlap with the other radiation element, deterioration in isolation characteristics between the radiation elements can be suppressed.

In the antenna module 100F, the distance between the flat electrode 145 and the radiation element 121 in the power feeding wire 141 for the radiation element 121 is set larger than the distance between the flat electrode 146 and the radiation element 122. In the antenna module 100F, since the radiation element 122 is disposed closer to the lower surface 132 side than the radiation element 121, when the flat electrode 145 is brought close to the radiation element 121, the distance between the flat electrode and the radiation element 122 becomes short, so that there is a concern that isolation may be deteriorated. Therefore, by making the distance between the flat electrode 145 and the radiation element 121 larger than the distance between the flat electrode 146 and the radiation element 122, the coupling between the flat electrode 145 and the radiation element 122 is suppressed.

The arrangement of the radiation element 121 and the radiation element 122 is not limited to the configuration described above, but may include, for example, a configuration in which both the radiation element 121 and the radiation element 122 are disposed in different layers within the dielectric substrate 130. Alternatively, the radiation element 122 may be disposed in a layer closer to the upper surface 131 of the dielectric substrate 130.

Variation 7

In Variation 7, a configuration of a dual-polarization type antenna module capable of radiating radio waves in two different polarization directions from each radiation element will be described.

Figure 10:
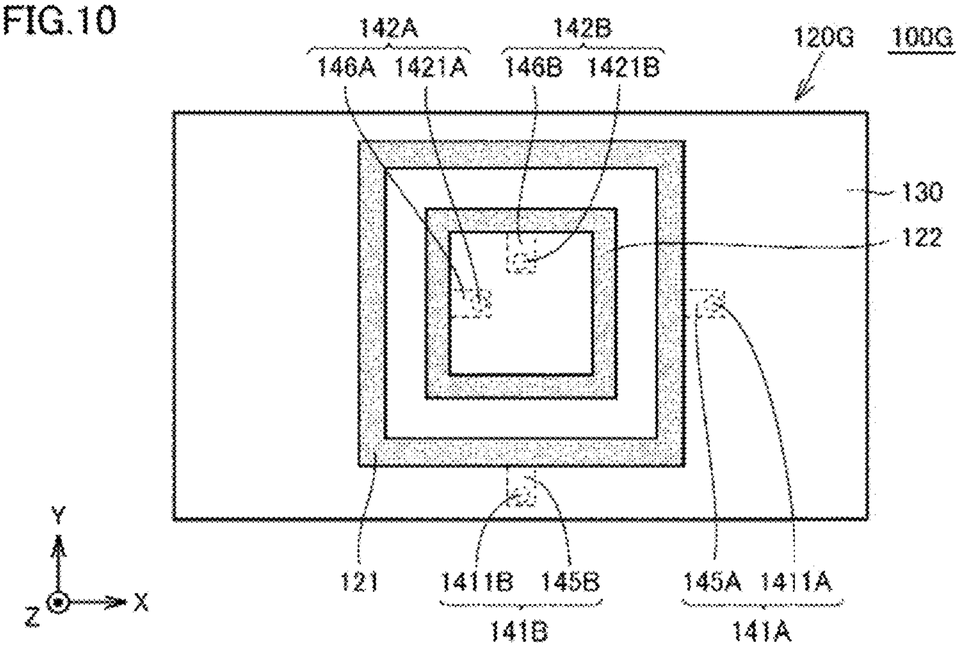
FIG. 10 is a plan view of an antenna module of Variation 7.

FIG. 10 is a plan view of an antenna module 100G of Variation 7. In an antenna device 120G of the antenna module 100G, high-frequency signals are supplied to two different positions for each of the radiation elements 121 and 122.

More specifically, a high-frequency signal is supplied to the radiation element 121 by a power feeding wire 141A near the center of a side of the radiation element 121 along the Y-axis on the positive side of the X-axis, and a high-frequency signal is supplied to the radiation element 121 by a power feeding wire 141B near the center of a side of the radiation element 121 along the X-axis on the negative side of the Y-axis. The power feeding wire 141A includes a flat electrode 145A and a via 1411A, and the power feeding wire 141B includes a flat electrode 145B and a via 1411B.

The flat electrode 145A extends from the radiation element 121 in the positive direction of the X-axis, and the via 1411A is connected to an end portion of the flat electrode 145A in the positive direction of the X-axis. The flat electrode 145B extends from the radiation element 121 in the negative direction of the Y-axis, and the via 1411B is connected to an end portion of the flat electrode 145B in the negative direction of the Y-axis. The flat electrodes 145A and 145B and the radiation element 121 may be capacitance-coupled or directly connected.

When a high-frequency signal is supplied via the flat electrode 145A, a radio wave having a polarization direction in the X-axis direction is radiated. When a high-frequency signal is supplied via the flat electrode 145B, a radio wave having a polarization direction in the Y-axis direction is radiated.

Further, a high-frequency signal is supplied to the radiation element 122 by a power feeding wire 142A near the center of a side of the radiation element 122 along the Y-axis on the negative side of the X-axis, and a high-frequency signal is supplied to the radiation element 122 by a power feeding wire 142B near the center of a side of the radiation element 122 along the X-axis on the positive side of the Y-axis. The power feeding wire 142A includes a flat electrode 146A and a via 1421A, and the power feeding wire 142B includes a flat electrode 146B and a via 1421B.

The flat electrode 146A extends from the radiation element 122 in the positive direction of the X-axis, i.e., from the radiation element 122 to the inside of the loop; and a via 1421A is connected to an end portion of the flat electrode 146A in the positive direction of the X-axis. The flat electrode 146B extends from the radiation element 122 in the negative direction of the Y-axis, i.e., from the radiation element 122 to the inside of the loop; and a via 1421B is connected to an end portion of the flat electrode 146B in the negative direction of the Y-axis. The flat electrodes 146A and 146B and the radiation element 122 may be capacitance-coupled or directly connected.

When a high-frequency signal is supplied via the flat electrode 146A, a radio wave having a polarization direction in the X-axis direction is radiated. When a high-frequency signal is supplied via the flat electrode 146B, a radio wave having a polarization direction in the Y-axis direction is radiated.

Even in such a dual-polarization type configuration, since the impedance between the radiation element and the power feeding wire can be finely adjusted by adjusting the capacitance-coupling between the radiation element and the flat electrode and/or the offset amount between the radiation element and the via, deterioration in antenna characteristics caused by impedance mismatch can be suppressed.

Further, since the via offset from the radiation element is disposed so as not to overlap with the other radiation element, deterioration in isolation characteristics between the radiation elements can be suppressed.

Further, in the same polarization direction, by arranging the power feeding position of the radiation element 121 and the power feeding position of the radiation element 122 in opposite directions with respect to the winding axes of the radiation elements 121 and 122, it is possible to further suppress deterioration in isolation characteristics between the radiation elements.

The "power feeding wire 141A", the "power feeding wire 142A", the "power feeding wire 141B" and the "power feeding wire 142B" in Variation 7 correspond to the "first power feeding wire", the "second power feeding wire", the "third power feeding wire" and the "fourth power feeding wire" in the present disclosure, respectively. The "flat electrode 145A", the "flat electrode 146A", the "flat electrode 145B" and the "flat electrode 146B" in Variation 7 correspond to the "first flat electrode", the "second flat electrode", the "third flat electrode" and the "fourth flat electrode" in the present disclosure, respectively. The "via 1411A", the "via 1421A", the "via 1411B" and the "via 1421B" in Variation 7 correspond to the "first conductor", the "second conductor", the "fifth conductor" and the "sixth conductor" in the present disclosure, respectively.

Variation 8

In Variation 8, a case where the ground electrode GND of the dielectric substrate 130 has a different arrangement will be described.

Figure 11:
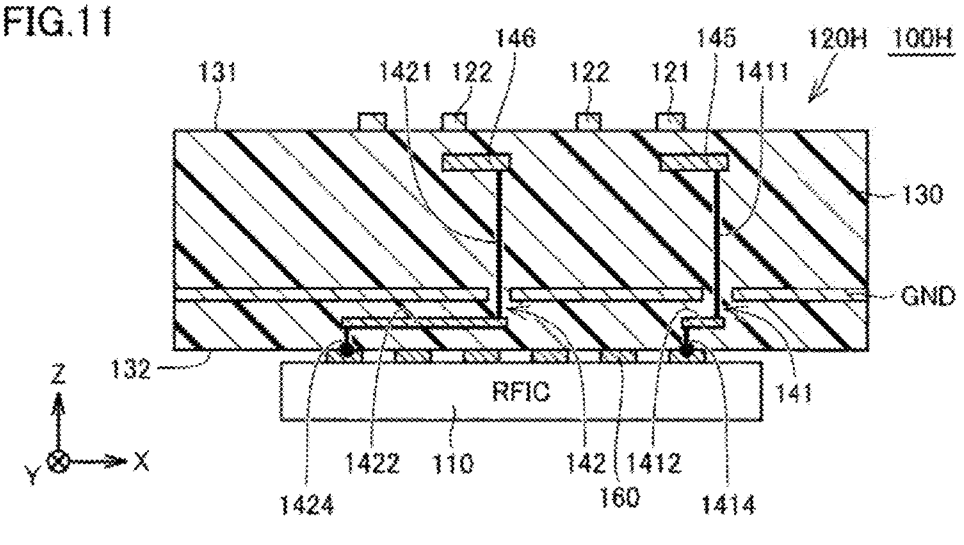
FIG. 11 is a plan view of an antenna module of Variation 8.

FIG. 11 is a transparent side view of an antenna module 100H of Variation 8. In an antenna device 120H of the antenna module 100H, the ground electrode GND is disposed closer to the upper surface 131 than the antenna module 100. The flat electrode 1412 of the power feeding wire 141 and the flat electrode 1422 of the power feeding wire 142 are disposed between the ground electrode GND and the lower surface 132 of the dielectric substrate 130. The vias 1411 and 1421 pass through the ground electrode GND to be connected to the flat electrodes 145 and 146, respectively.

Thus, by providing the wiring layer between the ground electrode GND and the lower surface 132 of the dielectric substrate 130, the ground electrode GND functions as a shield, so that undesired coupling between the radiation elements 121 and 122 and the flat electrodes 1412 and 1422 can be prevented.

Generally, when the distance between the radiation element and the ground electrode is large, the frequency bandwidth of the radiated radio wave tends to be wide; therefore, when the ground electrode GND is brought close to the upper surface 131 side, there is a possibility that the frequency bandwidth is narrowed. On the other hand, if the frequency bandwidth is attempted to be maintained, the dimension of the dielectric substrate 130 in the Z-axis direction will become large, so that there is a possibility that miniaturization and reduction in height of the entire device are inhibited. Therefore, the position where the ground electrode GND is disposed is appropriately selected in accordance with the required antenna characteristics and antenna size.

Even in such a configuration, since the impedance between the radiation element and the power feeding wire can be finely adjusted by adjusting the capacitance-coupling between the radiation element and the flat electrode and/or the offset amount between the radiation element and the via, deterioration in antenna characteristics caused by impedance mismatch can be suppressed. In addition, since undesired coupling between the radiation elements and the power feeding wires can be prevented by the shielding function of the ground electrode GND, impedance changes and loss increases caused by undesired coupling can be suppressed.

Further, since the via offset from the radiation element is disposed so as not to overlap with the other radiation element, deterioration in isolation characteristics between the radiation elements can be suppressed.

Variation 9

In Variation 9, a configuration in which three loop antennas with different frequency bands are arranged on the same dielectric substrate will be described.

Figure 12:
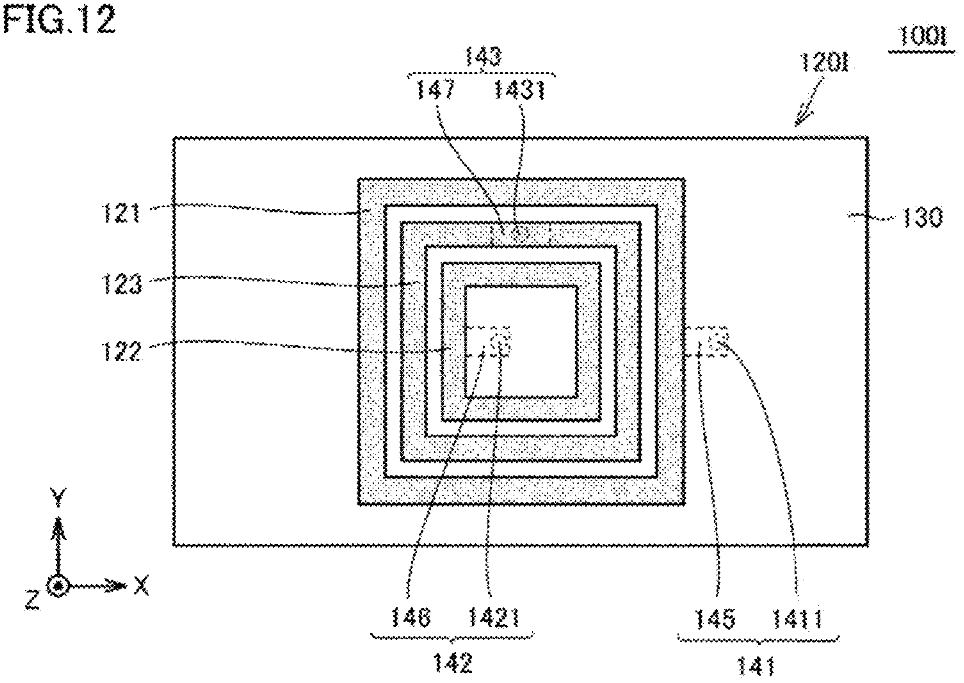
FIG. 12 is a transparent side view of an antenna module of Variation 9.

FIG. 12 is a plan view of an antenna module 100I of Variation 9. In an antenna device 120I of the antenna module 100I, a loop-shaped radiation element 123 is further added to the configuration of the antenna module 100 of Embodiment 1.

As shown in FIG. 12, when viewed in plan view from the normal direction of the dielectric substrate 130, the radiation element 123 is disposed between the radiation elements 121 and 122 in a region that does not overlap with the radiation elements 121 and 122. More specifically, the radiation element 123 is disposed within the loop of the radiation element 121, and the radiation element 122 is disposed within the loop of the radiation element 123. That is, the radiation elements 121 and 122, and 123 have a triple loop structure with a common winding axis. The length of the path of the radiation element 123 is shorter than the length of the path of the radiation element 121 and longer than the length of the path of the radiation element 122. Therefore, the frequency of the radio wave radiated from the radiation element 123 is higher than the frequency of the radio wave radiated from the radiation element 121 and lower than the frequency of the radio wave radiated from the radiation element 122. The winding axes of the radiation elements 121 and 122, and 123 do not necessarily have to be common to each other as long as they are disposed inside the radiation element 122.

The radiation element 121 is supplied with a high-frequency signal by the power feeding wire 141 that includes the flat electrode 145 and the via 1411. The flat electrode 145 is disposed so as to extend from near the center of a side of the radiation element 121 along the Y-axis on the positive side of the X-axis to the positive direction of the X-axis. The via 1411 is disposed in an end portion of the flat electrode 145 in the positive direction of the X-axis. That is, the via 1411 is disposed at a position offset to the outside of the radiation element 121.

A high-frequency signal is supplied to the radiation element 122 by the power feeding wire 142 that includes the flat electrode 146 and the via 1421. The flat electrode 146 is disposed so as to extend from near the center of a side of the radiation element 122 along the Y-axis on the negative side of the X-axis to the positive direction of the X-axis. The via 1421 is disposed in an end portion of the flat electrode 146 in the positive direction of the X-axis. That is, the via 1421 is disposed at a position offset to the inside of the radiation element 122.

A high-frequency signal is supplied to the radiation element 123 by a power feeding wire 143 that includes a flat electrode 147 and a via 1431. The flat electrode 147 is disposed so as to overlap with the radiation element 123 near the center of a side of the radiation element 121 along the X-axis on the positive side of the Y-axis. The flat electrode 147 is disposed apart from the radiation element 123 in the Z-axis direction. The flat electrode 147 and the radiation element 123 are capacitance-coupled to each other.

The via 1431 is disposed near the center of the flat electrode 147. That is, the via 1431 is disposed at a position overlapping with the radiation element 123 when viewed in plan view from the normal direction of the dielectric substrate 130. Therefore, the via 1431 does not overlap with the radiation element 121 and the radiation element 122. When the distance between the radiation element 121 and the radiation element 123 and/or the distance between the radiation element 122 and the radiation element 123 is large, the via 1431 may be disposed in a region between the radiation elements as long as it does not overlap with the radiation elements 121 and 122.

Even in the antenna module having such a triple loop structure, since the impedance between the radiation element and the power feeding wire can be finely adjusted by adjusting the capacitance-coupling between the radiation element and the flat electrode and/or the offset amount between the radiation element and the via, deterioration in antenna characteristics caused by impedance mismatch can be suppressed.

Further, since the via offset from the radiation element is disposed so as not to overlap with the other radiation element, deterioration in isolation characteristics between the radiation elements can be suppressed.

The "radiation element 123" in Variation 9 corresponds to the "third radiation element" in the present disclosure.

Variation 10

In Variation 10, a first example of a configuration in which, in addition to the two loop antennas, another type of radiation element is arranged on the same dielectric substrate will be described.

Figure 13:
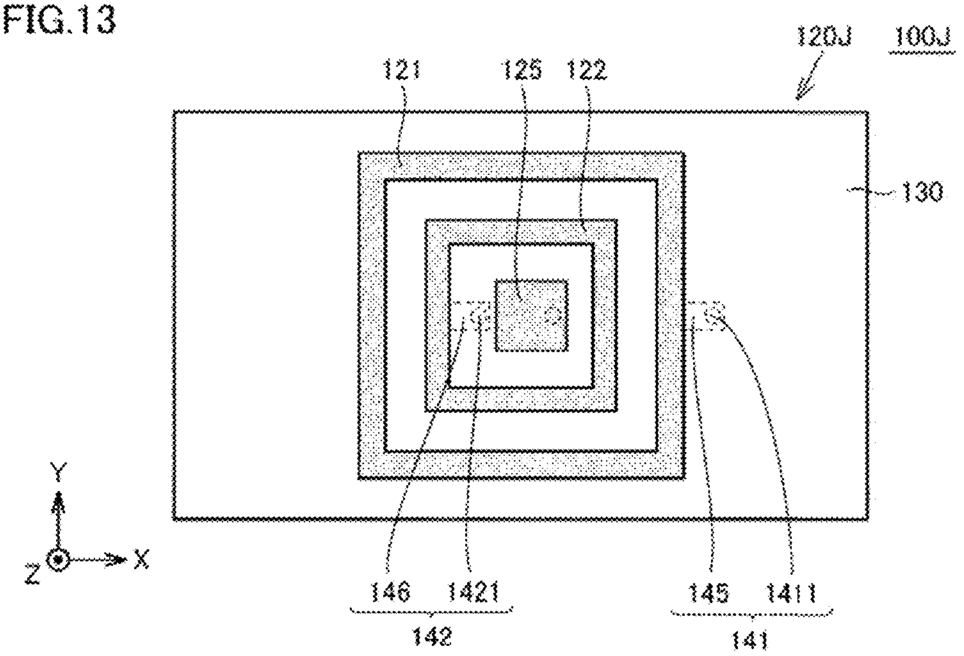
FIG. 13 is a plan view of an antenna module of Variation 10.

FIG. 13 is a plan view of an antenna module 100J of Variation 10. In an antenna device 120J of the antenna module 100J, a radiation element 125, which is a flat plate-shaped patch antenna, is further added to the configuration of the antenna module 100 of Embodiment 1.

As shown in FIG. 13, when viewed in plan view from the normal direction of the dielectric substrate 130, the radiation element 125 has a substantially square shape and is disposed within the loop of the radiation element 122. That is, the radiation element 125 is disposed in a region that does not overlap with the radiation element 121 and the radiation element 122.

In the case of a patch antenna, the dimension in the polarization direction of the radiation element corresponds to ½ of the wavelength of the radiated radio wave; therefore, the frequency of the radio wave radiated from the radiation element 125 is higher than the frequencies of the radio waves radiated from the radiation elements 121 and 122.

In FIG. 13, the via 1421 of the power feeding wire 142 of the radiation element 122 is disposed so as to be offset to the inside of the loop of the radiation element 122; however, when the via 1421 and the radiation element 125 overlap with each other, the via 1421 may be disposed in a region between the radiation element 121 and the radiation element 122.

Even in the antenna module having such a configuration, since the impedance between the radiation element and the power feeding wire can be finely adjusted by adjusting the capacitance-coupling between the radiation element and the flat electrode and/or the offset amount between the radiation element and the via, deterioration in antenna characteristics caused by impedance mismatch can be suppressed.

Further, since the via offset from the radiation element is disposed so as not to overlap with the other radiation element, deterioration in isolation characteristics between the radiation elements can be suppressed.

The "radiation element 125" in Variation 10 corresponds to the "third radiation element" in the present disclosure.

Variation 11

In Variation 11, a second example of a configuration in which, in addition to the two loop antennas, another type of radiation element is arranged on the same dielectric substrate will be described.

Figure 14:
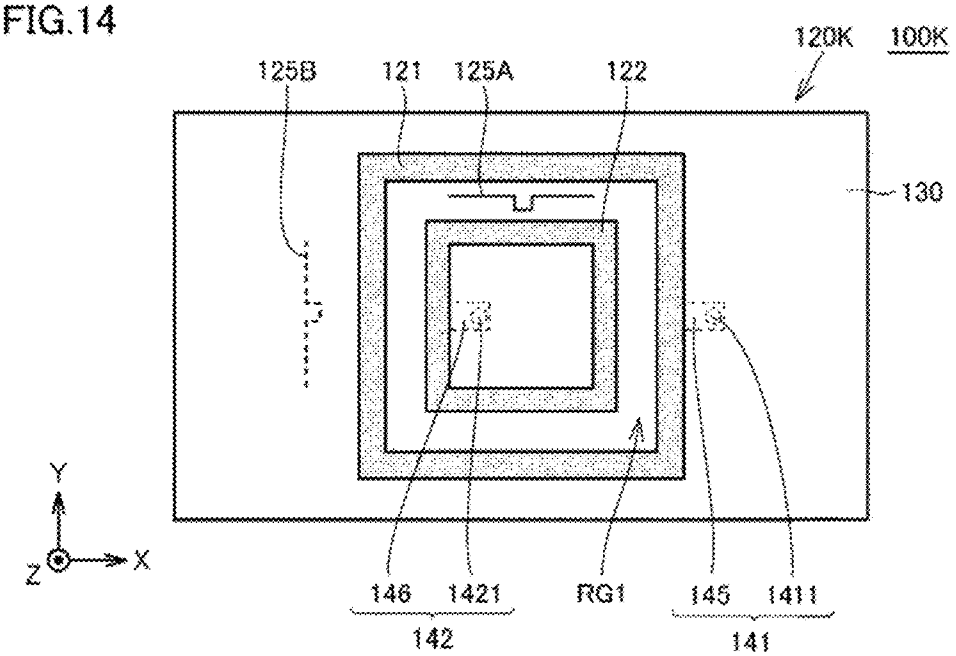
FIG. 14 is a plan view of an antenna module of Variation 11.

FIG. 14 is a plan view of an antenna module 100K of Variation 11. In an antenna device 120K of the antenna module 100K, a radiation element 125A, which is a dipole antenna, is further added to the configuration of the antenna module 100 of Embodiment 1.

Referring to FIG. 14, when viewed in plan view from the normal direction of the dielectric substrate 130, the radiation element 125A is disposed between the radiation element 121 and the radiation element 122 in a region RG1 that does not overlap with the radiation element 121 and the radiation element 122. In the case of the example of FIG. 13, the radiation element 125A is disposed so as to extend, in a portion of the region RG1 in the positive direction of the Y-axis, in the X-axis direction. Note that the radiation element 125A may also be disposed in another portion of the region RG1.

Alternatively, instead of or in addition to the radiation element 125A, a radiation element 125B indicated by a broken line may be disposed in a region of the dielectric substrate 130 outside the radiation element 121. In such a case as well, the radiation element 125B is disposed in a region of the dielectric substrate 130 that does not overlap with the radiation elements 121 and 122.

Even in the antenna module having such a configuration, since the impedance between the radiation element and the power feeding wire can be finely adjusted by adjusting the capacitance-coupling between the radiation element and the flat electrode and/or the offset amount between the radiation element and the via, deterioration in antenna characteristics caused by impedance mismatch can be suppressed.

Further, since the via offset from the radiation element is disposed so as not to overlap with the other radiation element, deterioration in isolation characteristics between the radiation elements can be suppressed.

FIG. 14 has been described by using a case where the radiation elements 125A and 125B are dipole antennas as an example; however, other linear antennas such as monopole antennas may be used as the radiation elements 125A and 125B.

Each of the "radiation element 125A" and the "radiation element 125B" in Variation 11 corresponds to the "third radiation element" in the present disclosure, respectively.

Variation 12

In Variation 12, another configuration of power feeding wires for feeding high-frequency signals to radiation elements will be described.

Figure 15:
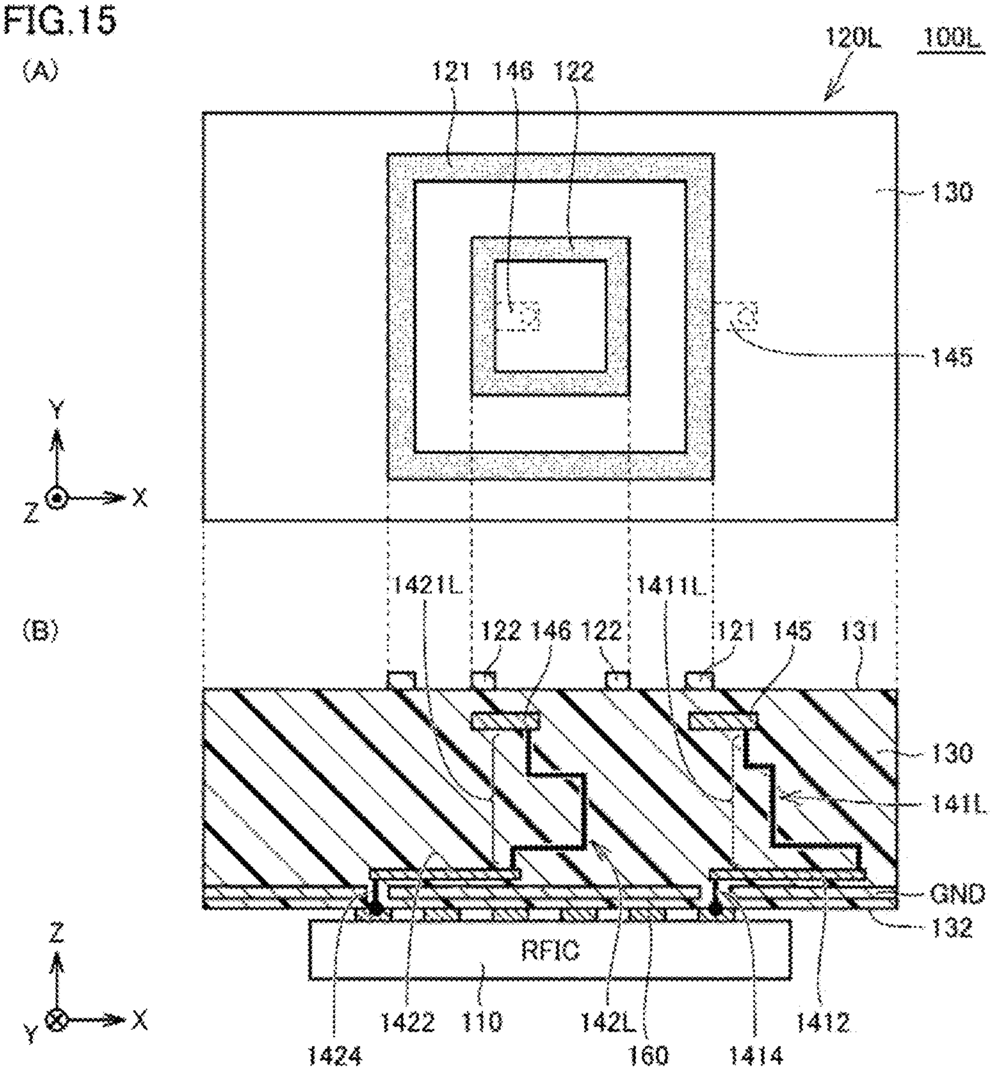
FIG. 15 is a plan view and a transparent side view of an antenna module of Variation 12.

FIG. 15 is a plan view and a transparent side view of an antenna module 100L of Variation 12. In an antenna device 120L of the antenna module 100L, the power feeding wires 141 and 142 in the antenna module 100 of Embodiment 1 are replaced with power feeding wires 141L and 142L.

As shown in FIG. 15, in the power feeding wires 141L and 142L of the antenna module 100L, portions (conductors 1411L and 1421L) corresponding to the vias 1411 and 1421 of the power feeding wires 141 and 142 are configured by a combination of a plurality of flat electrodes and a plurality of vias, instead of being configured by a single via extending in the Z-axis direction.

With such a configuration, since the adjustment allowance of the length of the path of the power feeding wire is increased, impedance matching is facilitated. Further, since residual copper rate can be prevented from locally increasing in the thickness direction (Z-axis direction) of the dielectric substrate compared to the case where the dielectric substrate is configured by a single via, structural defects such as cracks occurring at the boundary between the conductor portion and the dielectric portion due to differences in the thermal expansion coefficient can be suppressed.

Further, the conductors 1411L and 1421L are disposed so as not to overlap with the radiation elements 121 and 122 when viewed in plan view from the normal direction of the dielectric substrate 130. With such a configuration, deterioration in isolation characteristics between the radiation elements can be suppressed.

The "conductor 1411L" and the "conductor 1421L" in Variation 12 correspond to the "first conductor" and the "second conductor" in the present disclosure.

Variation 13

In Variation 13, a configuration is described in which, in a configuration in which the area of the ground electrode cannot be sufficiently secured in the polarization direction, deterioration in antenna characteristics is suppressed by disposing peripheral electrodes in layers between the radiation elements and the ground electrode.

Figure 16:
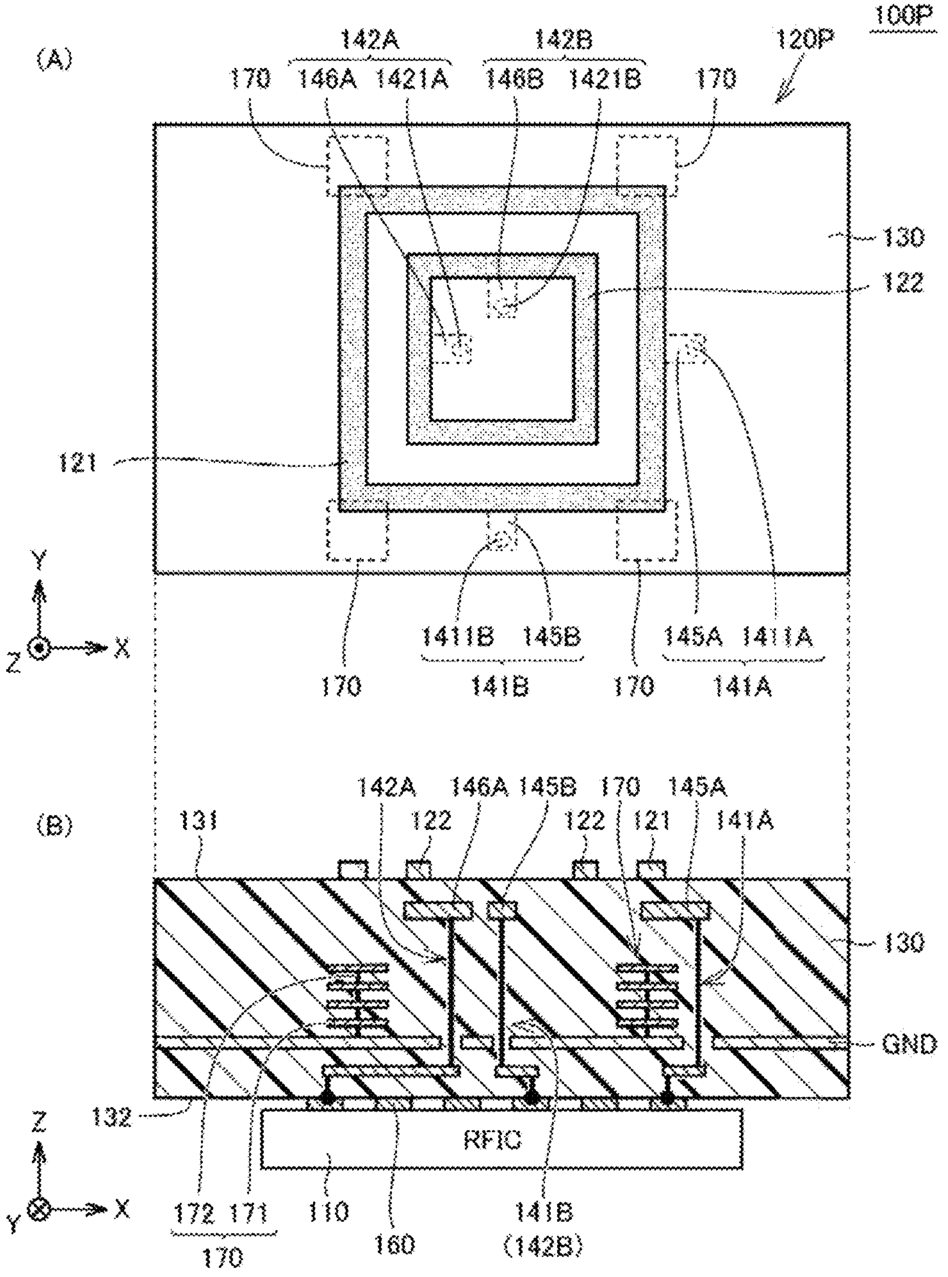
FIG. 16 is a plan view and a transparent side view of an antenna module of Variation 13.

FIG. 16 is a plan view (FIG. 16(A)) and a transparent side view (FIG. 16(B)) of an antenna module 100P of Variation 13. An antenna device 120P of the antenna module 100P has a configuration in which peripheral electrodes 170 are added to layers between the radiation elements 121 and 122 and the ground electrode GND of the dual-polarization type antenna module described in Variation 7 of FIG. 10. When viewed in plan view from the normal direction of the dielectric substrate 130, the peripheral electrodes 170 are disposed in four corner portions of the end portions of the radiation element 121 in the Y-axis direction, on a side close to the dielectric substrate 130. Each of the peripheral electrodes 170 includes a plurality of substantially rectangular flat electrodes 171 spaced apart from each other in the Z-axis direction, and a via 172 connecting the flat electrodes 171 to the ground electrode GND.

When the area of the ground electrode GND is limited due to a demand for miniaturization, such as in the Y-axis direction of the antenna module 100P, an electric field may be generated as a part of the electric field between the radiation element 121 on low-frequency side and the ground electrode GND goes around the rear side of the ground electrode GND. Due to the generation of such an electric field, it becomes difficult for the radio wave to be radiated from the radiation element 121 compared to a case where the area of the ground electrode GND is sufficiently large, thereby deteriorating the antenna characteristics.

However, by disposing the peripheral electrode 170 connected to the ground electrode GND, electric force lines are preferentially generated between the radiation element 121 and the peripheral electrode 170, thereby suppressing the generation of the electric field that goes around the rear side of the ground electrode GND. That is, the area of the ground electrode GND in the polarization direction can be considered to be substantially enlarged by the peripheral electrode 170. Therefore, even when the area of the ground electrode GND is limited due to a demand for miniaturization, deterioration in antenna characteristics of the radiation element 121 can be suppressed.

Further, with respect to the radiation element 121 on the low-frequency side, since the via of the power feeding wire is disposed between two peripheral electrodes 170, isolation between the two polarization waves can be improved.

Embodiment 2

In Embodiment 1 and Variations 1 to 12, a case where the number of the sets of antenna elements composed of the radiation element 121 and the radiation element 122 is one has been described. In Embodiment 2, a case of an array antenna in which a plurality of sets of antenna elements are arranged will be described.

Figure 17:
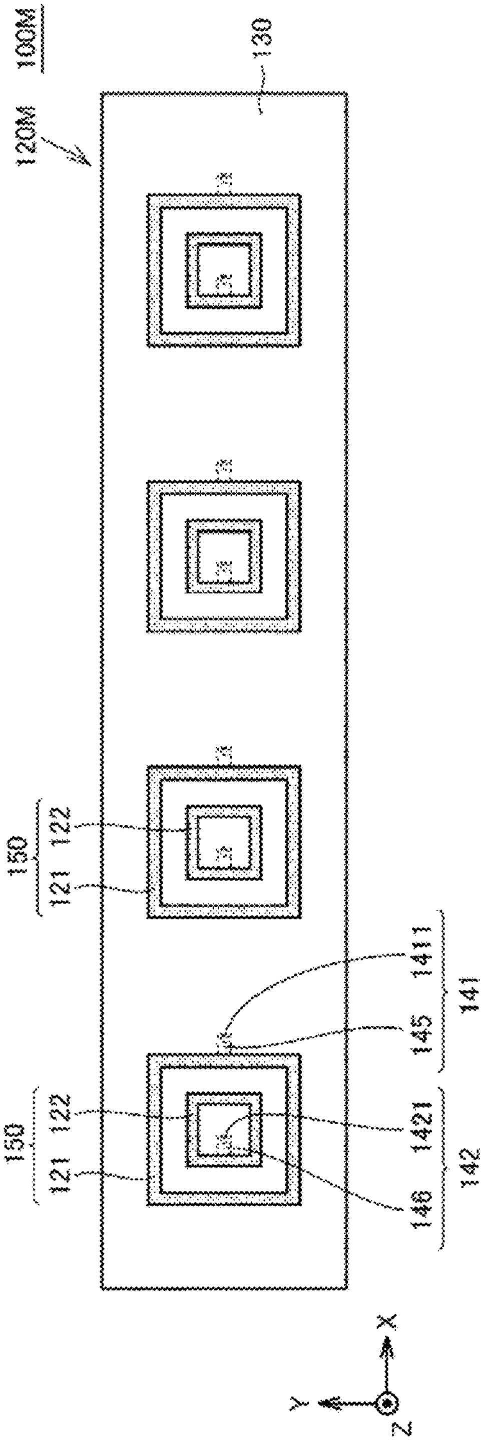
FIG. 17 is a plan view of an antenna module according to Embodiment 2.

FIG. 17 is a plan view of an antenna module 100M according to Embodiment 2. An antenna device 120M of the antenna module 100M has a configuration of a one-dimensional array in which four sets of antenna elements 150 are disposed apart from each other in the X-axis direction in a rectangular dielectric substrate 130. Each of the antenna elements 150 has the same configuration as the antenna module 100 shown in FIG. 2, and includes a radiation element 121 and a radiation element 122. The radiation element 121 is supplied with a high-frequency signal via a flat electrode 145 extending in the X-axis direction and a via 1411 offset in the X-axis direction. The radiation element 122 is supplied with a high-frequency signal via a flat electrode 146 extending in the X-axis direction and a via 1421 offset in the X-axis direction.

Even in such a configuration of the array antenna, since the impedance between the radiation element and the power feeding wire can be finely adjusted by adjusting the capacitance-coupling between the radiation element and the flat electrode and/or the offset amount between the radiation element and the via, deterioration in antenna characteristics caused by impedance mismatch can be suppressed.

Further, since the via offset from the radiation element is disposed so as not to overlap with the other radiation element, deterioration in isolation characteristics between the radiation elements can be suppressed.

In Embodiment 2, one of two adjacent "antenna elements 150" corresponds to the "first antenna element" in the present disclosure, and the other corresponds to the "second antenna element" in the present disclosure.

Variation 14

In Variation 14, a case of an antenna module having a configuration of a two-dimensional array will be described.

Figure 18:
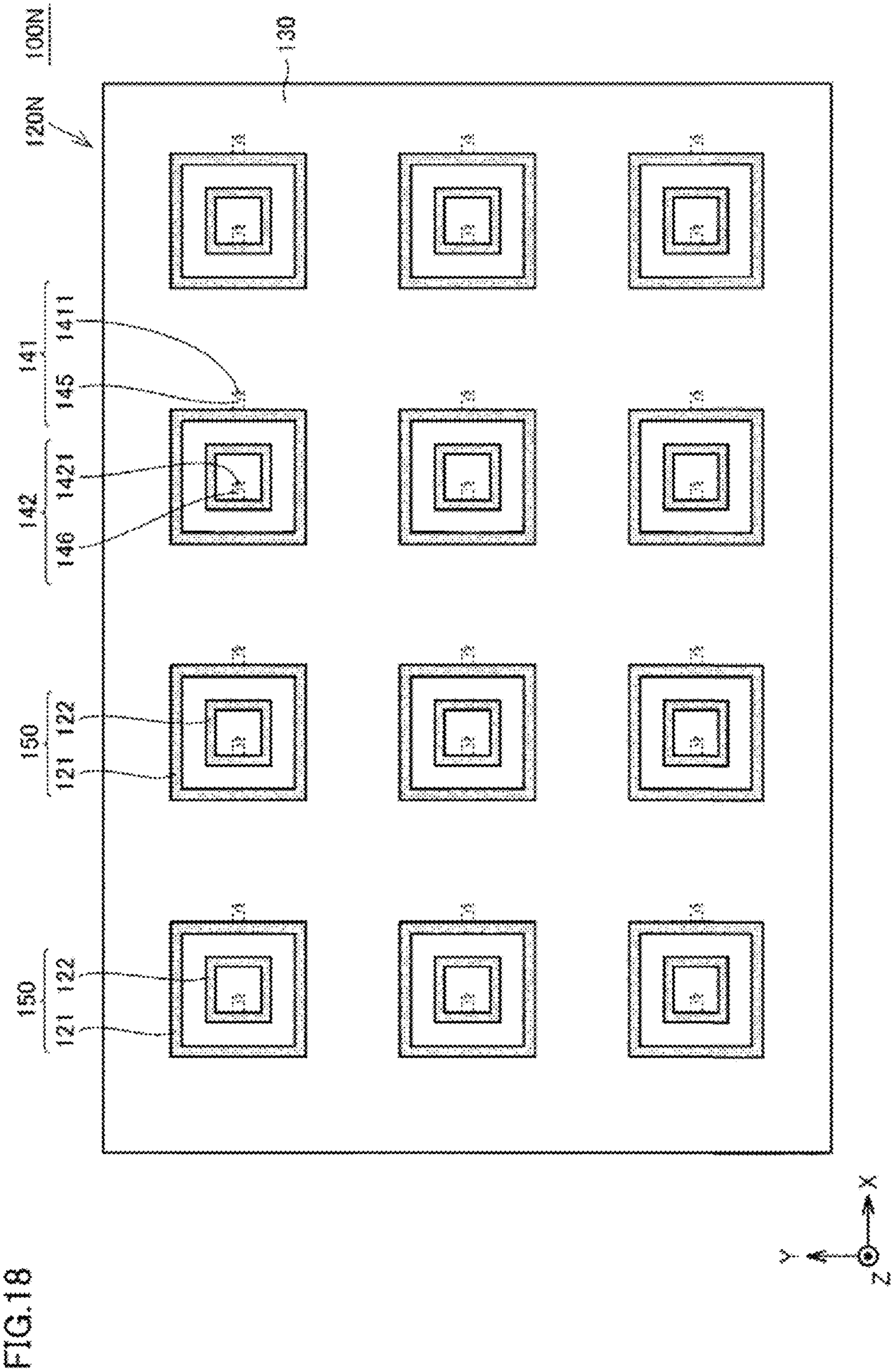
FIG. 18 is a plan view of an antenna module of Variation 14.

FIG. 18 is a plan view of an antenna module 100N of Variation 14. An antenna device 120N of the antenna module 100N has a configuration in which twelve sets of antenna elements 150 are two-dimensionally arranged in a rectangular dielectric substrate 130. More specifically, the antenna module 100N is a 4×3 two-dimensional array antenna in which four antenna elements 150 are spaced apart in the X-axis direction and three antenna elements 150 are spaced apart in the Y-axis direction. The number and arrangement of the antenna elements are not limited to the above.

Also in the antenna module 100N, each of the antenna elements 150 has the same configuration as that of the antenna module 100 shown in FIG. 2, and includes a radiation element 121 and a radiation element 122. The radiation element 121 is supplied with a high-frequency signal via a flat electrode 145 extending in the X-axis direction and a via 1411 offset in the X-axis direction. The radiation element 122 is supplied with a high-frequency signal via a flat electrode 146 extending in the X-axis direction and a via 1421 offset in the X-axis direction.

Even in the configuration of such a two-dimensional array antenna, since the impedance between the radiation element and the power feeding wire can be finely adjusted by adjusting the capacitance-coupling between the radiation element and the flat electrode and/or the offset amount between the radiation element and the via, deterioration in antenna characteristics caused by impedance mismatch can be suppressed.

Further, since the via offset from the radiation element is disposed so as not to overlap with the other radiation element, deterioration in isolation characteristics between the radiation elements can be suppressed.

Embodiment 3

In each of the above embodiments and variations, a case in which each loop antenna is formed by a flat plate-shaped wiring pattern with the stacking direction of the dielectric substrate as the winding axis direction is described. In Embodiment 3, a case will be described in which the loop antenna is formed by straight line-shaped wiring patterns and vias.

Figure 19:
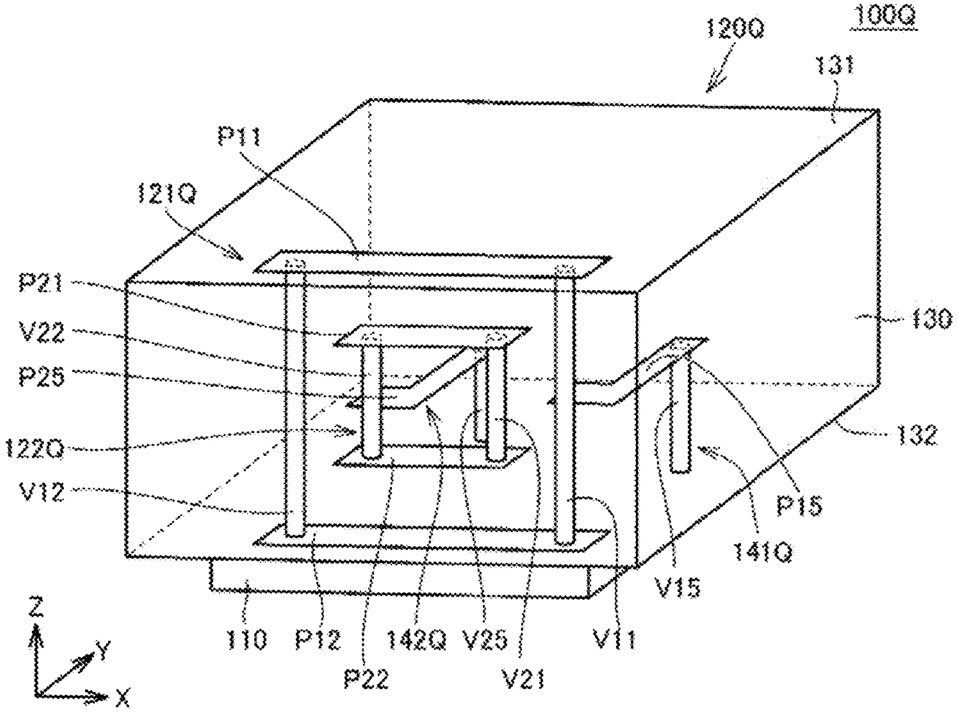
FIG. 19 is a perspective view of an antenna module according to Embodiment 3.

FIG. 19 is a perspective view of an antenna module 100Q according to Embodiment 3. The antenna module 100Q includes radiation elements 121Q and 122Q constituting the loop antenna, and power feeding wires 141Q and 142Q. Each of the radiation elements 121Q and 122Q has a loop shape in which the winding axis direction is the Y-axis direction orthogonal to the normal direction of a dielectric substrate 130.

The radiation element 121Q includes, in the dielectric substrate 130, straight line-shaped flat electrodes P11 and P12 spaced apart from each other in the stacking direction (Z-axis direction) and extending in the X-axis direction, and vias V11 and V12 connecting the flat electrodes P11 and P12. The via V11 connects the end portions of the flat electrodes P11 and P12 in the positive direction of the X-axis to each other. The via V12 connects the end portions of the flat electrodes P11 and P12 in the negative direction of the X-axis to each other.

Similarly, the radiation element 1220 includes, in the dielectric substrate 130, straight line-shaped flat electrodes P21 and P22 spaced apart from each other in the stacking direction and extending in the X-axis direction, and vias V21 and V22 connecting the flat electrodes P21 and P22. The via V21 connects the end portions of the flat electrodes P21 and P22 in the positive direction of the X-axis to each other. The via V22 connects the end portions of the flat electrodes P21 and P22 in the negative direction of the X-axis to each other.

The lengths of the flat electrodes P21 and P22 and the vias V21 and V22 of the radiation element 1220 in the extending directions are shorter than the lengths of the flat electrodes P11 and P12 and the vias V11 and V12 of the radiation element 1210 in the extending directions. The radiation element 1220 is disposed so as to be within the loop of the radiation element 1210 when the dielectric substrate 130 is viewed in a plan view from the Y-axis direction.

Each of the power feeding wires 1410 and 1420 includes a flat electrode having a substantially L-shape when the dielectric substrate 130 is viewed in a plan view from the normal direction, and a via extending in the normal direction.

One end portion of a flat electrode P15 of the power feeding wire 1410 is disposed close to the via V11 at a position overlapping with the via V11 of the radiation element 121Q when the dielectric substrate 130 is viewed in a plan view from the Y-axis direction. The flat electrode P15 is offset from the position where it overlaps with the via V11 in the positive direction of the X-axis, and is further bent and extended in the positive direction of the Y-axis. Further, the flat electrode P15 is connected to an RFIC 110 arranged on a lower surface 132 by a via v15 connected to the other end portion of the flat electrode P15. When a high-frequency signal is supplied from the RFIC 110 by the power feeding wire 1410, a radio wave having a polarization direction in the X-axis direction is radiated from the radiation element 1210 in the Y-axis direction.

One end portion of a flat electrode P25 of the power feeding wire 1420 is disposed close to the via V21 at a position overlapping with the via V21 of the radiation element 122Q when the dielectric substrate 130 is viewed in a plan view from the Y-axis direction. The flat electrode P25 is offset from the position where it overlaps with the via V12 in the positive direction of the X-axis, and is further bent and extend in the positive direction of the Y-axis. Further, the flat electrode P25 is connected to the RFIC 110 arranged on the lower surface 132 by a via V25 connected to the other end portion of the flat electrode P25. When a high-frequency signal is supplied from the RFIC 110 by the power feeding wire 1420, a radio wave having a polarization direction in the X-axis direction is radiated from the radiation element 1220 in the Y-axis direction.

Even in such a configuration of the loop antenna formed in the stacking direction of the dielectric substrate, by forming the power feeding wire capacitance-coupled to the radiation element in a shape offset in the polarization direction, the degree of capacitance-coupling and the offset amount can be used as parameters for adjusting the impedance between the radiation element and the power feeding wire, so that the impedance can be finely adjusted. Therefore, deterioration in antenna characteristics caused by impedance mismatch can be suppressed.

The embodiments disclosed herein are to be considered in all respects as exemplary and not restrictive. The scope of the present invention is indicated by the claims rather than by the description of the embodiments above, and is intended to include all modifications within the meanings and ranges equivalent to the scope of the claims.

REFERENCE SIGNS LIST

10 communication device
100, 100A to 100N, 100P, 100Q, 100X antenna module
110 RFIC
111A to 111H, 113A to 113H, 117A, 117B switch
112AR to 112HR low noise amplifier
112AT to 112HT power amplifier
114A to 114H attenuator
115A to 115H phase shifter
116A, 116B signal combiner/distributor
118A, 118B mixer
119A, 119B amplification circuit
120, 120A to 120N, 120P, 120Q antenna device
121 to 123, 125, 125A, 125B radiation element
130 dielectric substrate
141, 141A, 141B, 141E, 141L, 141Q, 142, 142A, 142B, 142E, 142L, 1420, 143 power feeding wire
145, 145A, 145B, 146, 146A, 146B, 147, 1412, 1422, 171, P11, P12, P15, P21, P22, P25 flat electrode
150 antenna element
160 solder bump
1411, 1411A, 1411B, 1413, 1414, 1421, 1421A, 1421B, 1423, 1424, 1431, 172, V11, V12, V15, V21, V22, V25 via
1411L, 1421L conductor
170 peripheral electrode
200 BBIC
GND ground electrode

The invention claimed is:

1. An antenna module comprising:
a dielectric substrate;
a first radiation element disposed on the dielectric substrate and having a loop-shaped wiring pattern;
a second radiation element disposed inside a loop of the first radiation element when viewed in plan view from a winding axis direction of the first radiation element and having a loop-shaped wiring pattern; and
a first power feeding wire and a second power feeding wire that transmit high-frequency signals to the first radiation element and the second radiation element, respectively,
wherein
the first power feeding wire comprises:
a first flat electrode disposed apart from the first radiation element in the winding axis direction; and
a first conductor connected to the first flat electrode and extending in the winding axis direction,
the second power feeding wire comprises:
a second flat electrode disposed apart from the second radiation element in the winding axis direction; and
a second conductor connected to the second flat electrode and extending in the winding axis direction, and
when viewed in plan view from the winding axis direction,
the first flat electrode at least partially overlaps with the first radiation element and does not overlap with the second radiation element,
the second flat electrode at least partially overlaps with the second radiation element and does not overlap with the first radiation element, and
at least one of the first conductor and the second conductor is connected to the corresponding flat electrode at a position offset from the corresponding radiation element in a first polarization direction of the radiation element.

2. The antenna module of claim 1, wherein when viewed in plan view from the winding axis direction, the first flat electrode extends from an overlapping portion with the first radiation element to an outside of the loop of the first radiation element, and the first conductor is connected to the first flat electrode outside the loop of the first radiation element.

3. The antenna module of claim 1, wherein when viewed in plan view from the winding axis direction, the first flat electrode extends from an overlapping portion with the first radiation element to an outside of the loop of the first radiation element, and the first conductor is connected to the first flat electrode inside the loop of the first radiation element.

4. The antenna module of claim 1, wherein when viewed in plan view from the winding axis direction, the second flat electrode extends from an overlapping portion with the second radiation element to an outside of a loop of the second radiation element, and the second conductor is connected to the second flat electrode outside the loop of the second radiation element.

5. The antenna module of claim 1, wherein when viewed in plan view from the winding axis direction, the second flat electrode extends from an overlapping portion with the second radiation element to an inside of a loop of the second radiation element, and the second conductor is connected to the second flat electrode inside the loop of the second radiation element.

6. The antenna module of claim 1, wherein when viewed in plan view from the winding axis direction, a winding axis of the first radiation element is inside a loop of the second radiation element, and the first flat electrode and the second flat electrode are disposed on the same side with respect to the winding axis of the first radiation element.

7. The antenna module of claim 1, wherein when viewed in plan view from the winding axis direction, a winding axis of the first radiation element is inside a loop of the second radiation element, and the first flat electrode and the second flat electrode are disposed on opposite sides to each other with respect to the winding axis of the first radiation element.

8. The antenna module of claim 1, wherein when a length of the loop along a center of the wiring pattern of the first radiation element is L1, a shortest distance between a center of the first conductor and the center of the wiring pattern of the first radiation element is ½ or less of L1.

9. The antenna module of claim 1, wherein when a length of a loop along a center of the wiring pattern of the second radiation element is L2, a shortest distance between a center of the second conductor and the center of the wiring pattern of the second radiation element is ½ or less of L2.

10. The antenna module according to claim 9, wherein in the second radiation element, when a dimension of the second radiation element in an offset direction of the second conductor is S1, the shortest distance between the center of the second conductor and the center of the wiring pattern of the second radiation element is ½ or less of S1.

11. The antenna module according to claim 1, wherein the first radiation element and the second radiation element are disposed at different positions in the winding axis direction in the dielectric substrate.

12. The antenna module according to claim 1, further comprising:
at least one of a third conductor that connects the first radiation element and the first flat electrode and a fourth conductor that connects the second radiation element and the second flat electrode.

13. The antenna module according to claim 1, wherein at least either the first radiation element and the first flat electrode or the first radiation element and the second flat electrode are capacitance-coupled.

14. The antenna module of claim 1, further comprising:
a ground electrode disposed facing the first radiation element and the second radiation element in the winding axis direction in the dielectric substrate, wherein the first conductor and the second conductor pass through the ground electrode.

15. The antenna module of claim 1, wherein at least one of the first conductor and the second conductor is composed of a plurality of flat electrodes and a plurality of vias.

16. The antenna module according claim 1, further comprising:
a third power feeding wire that transmits, to the first radiation element, a high-frequency signal for radiating a radio wave in a second polarization direction different from the first polarization direction; and
a fourth power feeding wire that transmits, to the second radiation element, a high-frequency signal for radiating a radio wave in the second polarization direction,
wherein
the third power feeding wire comprises:
a third flat electrode disposed apart from the first radiation element in the winding axis direction; and
a fifth conductor connected to the third flat electrode and extending in the winding axis direction, and
the fourth power feeding wire comprises:
a fourth flat electrode disposed apart from the second radiation element in the winding axis direction; and
a sixth conductor connected to the fourth flat electrode and extending in the winding axis direction.

17. The antenna module according to claim 16, wherein when viewed in plan view from the winding axis direction, a winding axis of the first radiation element is inside a loop of the second radiation element, the first flat electrode and the second flat electrode are disposed on opposite sides to each other with respect to the winding axis of the first radiation element, and the third flat electrode and the fourth flat electrode are disposed on opposite sides to each other with respect to the winding axis of the first radiation element.

18. The antenna module of claim 1, further comprising:
a third radiation element disposed in a region not overlapping with the first radiation element and the second radiation element when viewed in plan view from the winding axis direction, and capable of radiating a radio wave of a frequency band different from the first radiation element and the second radiation element.

19. The antenna module of claim 18, wherein the third radiation element is a loop antenna.

20. An antenna module comprising:

a dielectric substrate; and a first antenna element and a second antenna element disposed adjacent to each other on the dielectric substrate, wherein each of the first antenna element and the second antenna element comprises:

a first radiation element disposed on the dielectric substrate and having a loop-shaped wiring pattern;

a second radiation element disposed inside a loop of the first radiation element when viewed in plan view from a winding axis direction of the first radiation element and having a loop-shaped wiring pattern; and a first power feeding wire and a second power feeding wire that transmit high-frequency signals to the first radiation element and the second radiation element, respectively, the first power feeding wire comprises:

a first flat electrode disposed apart from the first radiation element in the winding axis direction; and a first conductor connected to the first flat electrode and extending in the winding axis direction, the second power feeding wire comprises:

a second flat electrode disposed apart from the second radiation element in the winding axis direction; and a second conductor connected to the second flat electrode and extending in the winding axis direction, and when viewed in plan view from the winding axis direction, the first flat electrode at least partially overlaps with the first radiation element and does not overlap with the second radiation element, the second flat electrode at least partially overlaps with the second radiation element and does not overlap with the first radiation element, and at least one of the first conductor and the second conductor is connected to the corresponding flat electrode at a position offset from the corresponding radiation element in a polarization direction of the radiation element.

* * * * *